US007859551B2

(12) United States Patent
Bulman et al.

(10) Patent No.: US 7,859,551 B2
(45) Date of Patent: Dec. 28, 2010

(54) OBJECT CUSTOMIZATION AND PRESENTATION SYSTEM

(76) Inventors: Richard L. Bulman, 10 Christopher St., Apt. 5D, New York, NY (US) 10014; Brad Dahl, 430 West 15th, Vancouver, B.C. (CA) V6B 2Z6; Steve Gravitz, 2251 E. 15th St., Brooklyn, NY (US) 11229

(*) Notice: Subject to any disclaimer, the term of this patent is extended or adjusted under 35 U.S.C. 154(b) by 2030 days.

(21) Appl. No.: 10/083,425

(22) Filed: Feb. 25, 2002
(Under 37 CFR 1.47)

(65) Prior Publication Data
US 2003/0051255 A1 Mar. 13, 2003

Related U.S. Application Data

(63) Continuation-in-part of application No. 09/300,987, filed on Apr. 28, 1999, now Pat. No. 6,351,265, which is a continuation of application No. 08/840,486, filed on Apr. 21, 1997, now abandoned, which is a continuation-in-part of application No. 08/489,564, filed on Jun. 12, 1995, now Pat. No. 5,623,587, which is a continuation-in-part of application No. 08/138,531, filed on Oct. 15, 1993, now abandoned.

(60) Provisional application No. 60/300,352, filed on Jun. 6, 2001.

(51) Int. Cl.
*G06T 15/00* (2006.01)

(52) U.S. Cl. .................. 345/630; 345/629; 345/428; 345/582; 705/30; 705/35; 382/115; 704/248; 40/700

(58) Field of Classification Search .......... 345/629, 345/630, 473–475, 738, 433, 428, 582; 705/30, 705/35; 382/115; 704/246; 40/700
See application file for complete search history.

(56) References Cited

U.S. PATENT DOCUMENTS 2,730,565 A 1/1956 Owens

| 3,398,664 A | 8/1968 | Bonatsos |
| 3,864,708 A | 2/1975 | Allen |
| 3,892,427 A | 7/1975 | Kraynak et al. |
| 3,899,848 A | 8/1975 | Bunin |

(Continued)

FOREIGN PATENT DOCUMENTS

| EP | 0326515 | 8/1989 |
| GB | 1330046 | 9/1973 |
| JP | 60016770 | 1/1985 |
| JP | 60016772 | 1/1985 |
| JP | 1081586 | 3/1989 |

(Continued)

OTHER PUBLICATIONS

Lu, Shin-Yee & Johnson, Robert K., "A New True 3-D Motion Camera System from Lawrence Livermore," Advanced Imaging, Jul. 1995, pp. 51-56.

(Continued)

*Primary Examiner*—Phu K Nguyen
(74) *Attorney, Agent, or Firm*—Kilpatrick Stockton LLP

(57) ABSTRACT

A method for generating a personalized presentation, comprising providing an Internet browser user interface for selecting an image and a surrounding context; receiving the selected image and surrounding context by an Internet web server; accounting for the user activity in a financial accounting system; and delivering the selected image and surrounding context to the user. The surrounding context may comprise a physical frame for a picture, with a printed version of the selected image framed therein. The accounting step may provide consideration to a rights holder of the selected image, or provide for receipt of consideration from a commercial advertiser. A plurality of images may be selected, wherein the context defines a sequence of display of the plurality of images.

65 Claims, 16 Drawing Sheets

U.S. PATENT DOCUMENTS

| | | | |
|---|---|---|---|
| 3,982,744 A | 9/1976 | Kraynak et al. |
| 4,007,487 A | 2/1977 | Vlahos |
| 4,037,249 A | 7/1977 | Pugsley |
| 4,052,739 A | 10/1977 | Wada et al. |
| 4,100,569 A | 7/1978 | Vlahos |
| 4,130,834 A | 12/1978 | Mender et al. |
| 4,190,856 A | 2/1980 | Ricks |
| 4,240,104 A | 12/1980 | Taylor et al. |
| 4,258,385 A | 3/1981 | Greenberg et al. |
| 4,261,012 A | 4/1981 | Maloomian |
| 4,280,148 A | 7/1981 | Saxena |
| 4,305,131 A | 12/1981 | Best |
| 4,317,114 A | 2/1982 | Walker |
| 4,333,152 A | 6/1982 | Best |
| 4,344,085 A | 8/1982 | Vlahos |
| 4,346,403 A | 8/1982 | Tamura |
| 4,357,492 A | 11/1982 | Campbell et al. |
| 4,357,624 A | 11/1982 | Greenberg |
| 4,409,618 A | 10/1983 | Inaba et al. |
| 4,439,783 A | 3/1984 | Nishikawa |
| 4,445,187 A | 4/1984 | Best |
| 4,463,380 A | 7/1984 | Hooks, Jr. |
| 4,481,412 A | 11/1984 | Fields |
| 4,486,774 A | 12/1984 | Maloomian |
| 4,498,081 A | 2/1985 | Fukushima et al. |
| 4,506,289 A | 3/1985 | Shirakami |
| 4,509,043 A | 4/1985 | Mossaides |
| 4,521,014 A | 6/1985 | Sitrick |
| 4,539,585 A | 9/1985 | Spackova et al. |
| 4,569,026 A | 2/1986 | Best |
| 4,572,509 A | 2/1986 | Sitrick |
| 4,616,327 A | 10/1986 | Rosewarne et al. |
| 4,645,459 A | 2/1987 | Graf et al. |
| 4,677,460 A | 6/1987 | Fass et al. |
| 4,688,105 A | 8/1987 | Bloch et al. |
| 4,710,873 A | 12/1987 | Breslow et al. |
| 4,730,260 A | 3/1988 | Mori et al. |
| 4,731,743 A | 3/1988 | Blancato |
| 4,764,817 A | 8/1988 | Blazek et al. |
| 4,783,833 A | 11/1988 | Kawabata et al. |
| 4,823,285 A | 4/1989 | Blancato |
| 4,841,378 A | 6/1989 | Cogert |
| 4,841,575 A * | 6/1989 | Welsh et al. ................. 704/260 |
| 4,846,693 A | 7/1989 | Baer |
| 4,872,056 A | 10/1989 | Hicks et al. |
| 4,891,748 A | 1/1990 | Mann |
| 4,987,552 A | 1/1991 | Nakamura |
| 4,992,781 A | 2/1991 | Iwasaki et al. |
| 4,996,649 A | 2/1991 | Kamei et al. |
| 5,057,940 A | 10/1991 | Murakami et al. |
| 5,060,171 A | 10/1991 | Steir et al. |
| 5,086,480 A | 2/1992 | Sexton |
| 5,091,849 A | 2/1992 | Davis et al. |
| 5,099,337 A | 3/1992 | Cury |
| 5,117,283 A | 5/1992 | Kroos et al. |
| 5,117,407 A | 5/1992 | Vogel |
| 5,119,080 A | 6/1992 | Kajimoto et al. |
| 5,184,295 A | 2/1993 | Mann |
| 5,185,665 A | 2/1993 | Okura et al. |
| 5,198,902 A | 3/1993 | Richards et al. |
| 5,208,872 A | 5/1993 | Fisher |
| 5,245,600 A | 9/1993 | Yamauchi et al. |
| 5,247,126 A | 9/1993 | Okamura et al. |
| 5,247,610 A | 9/1993 | Oshima et al. |
| 5,249,967 A | 10/1993 | O'Leary et al. |
| 5,262,856 A | 11/1993 | Lippman et al. |
| 5,280,530 A | 1/1994 | Trew et al. |
| 5,288,078 A | 2/1994 | Capper et al. |
| 5,289,568 A | 2/1994 | Hosoya et al. |
| 5,343,386 A | 8/1994 | Barber |
| 5,345,313 A | 9/1994 | Blank |
| 5,375,195 A | 12/1994 | Johnston |
| 5,384,912 A | 1/1995 | Ogrinc et al. |
| 5,394,517 A | 2/1995 | Kalawsky |
| 5,459,829 A * | 10/1995 | Doi et al. ................. 345/420 |
| 5,469,536 A | 11/1995 | Blank |
| 5,553,864 A | 9/1996 | Sitrick |
| 5,557,179 A | 9/1996 | Yang |
| 5,568,599 A | 10/1996 | Yoshino et al. |
| 5,577,179 A | 11/1996 | Blank |
| 5,617,482 A | 4/1997 | Brusewitz |
| 5,623,587 A | 4/1997 | Bulman |
| 5,625,570 A | 4/1997 | Vizireanu et al. |
| 5,629,980 A | 5/1997 | Stefik et al. |
| 5,634,012 A | 5/1997 | Stefik et al. |
| 5,638,443 A | 6/1997 | Stefik et al. |
| 5,644,690 A | 7/1997 | Yoshino et al. |
| 5,649,032 A | 7/1997 | Burt et al. |
| 5,657,402 A | 8/1997 | Bender et al. |
| 5,664,690 A | 9/1997 | Friesen |
| 5,666,416 A | 9/1997 | Micali |
| 5,668,595 A | 9/1997 | Katayama et al. |
| 5,677,955 A | 10/1997 | Doggett et al. |
| 5,680,528 A | 10/1997 | Korszun |
| 5,687,306 A | 11/1997 | Blank |
| 5,715,403 A | 2/1998 | Stefik |
| 5,717,757 A | 2/1998 | Micali |
| 5,724,497 A | 3/1998 | San et al. |
| 5,729,674 A | 3/1998 | Rosewarne et al. |
| 5,736,982 A | 4/1998 | Suzuki et al. |
| 5,771,046 A | 6/1998 | Izawa et al. |
| 5,774,125 A | 6/1998 | Suzuoki et al. |
| 5,793,382 A | 8/1998 | Yerazunis et al. |
| 5,793,868 A | 8/1998 | Micali |
| 5,802,296 A | 9/1998 | Morse et al. |
| 5,815,657 A | 9/1998 | Williams et al. |
| 5,830,065 A | 11/1998 | Sitrick |
| 5,839,119 A | 11/1998 | Krsul et al. |
| 5,846,132 A | 12/1998 | Junkin |
| 5,850,463 A | 12/1998 | Horii |
| 5,852,672 A | 12/1998 | Lu |
| 5,857,023 A | 1/1999 | Demers et al. |
| 5,870,101 A | 2/1999 | Murata et al. |
| 5,880,731 A | 3/1999 | Liles et al. |
| 5,880,737 A | 3/1999 | Griffin et al. |
| 5,884,029 A | 3/1999 | Brush, II et al. |
| 5,893,110 A | 4/1999 | Weber et al. |
| 5,903,317 A | 5/1999 | Sharir et al. |
| 5,903,880 A | 5/1999 | Biffar |
| 5,907,328 A | 5/1999 | Brush II et al. |
| 5,907,626 A | 5/1999 | Toklu et al. |
| 5,909,218 A | 6/1999 | Naka et al. |
| 5,912,671 A | 6/1999 | Oka |
| 5,915,093 A | 6/1999 | Berlin et al. |
| 5,923,330 A | 7/1999 | Tarlton et al. |
| 5,926,179 A | 7/1999 | Matsuda et al. |
| 5,930,777 A | 7/1999 | Barber |
| 5,933,148 A | 8/1999 | Oka et al. |
| 5,933,153 A | 8/1999 | Deering et al. |
| 5,933,498 A | 8/1999 | Schneck et al. |
| 5,937,394 A | 8/1999 | Wong et al. |
| 5,945,997 A | 8/1999 | Zhao et al. |
| 5,947,823 A | 9/1999 | Nimura |
| 5,956,038 A | 9/1999 | Rekimoto |
| 5,956,039 A | 9/1999 | Woods et al. |
| 5,963,214 A | 10/1999 | Cok |
| 5,963,217 A | 10/1999 | Grayson et al. |
| 5,963,668 A | 10/1999 | Horikawa et al. |
| 5,966,130 A | 10/1999 | Benman, Jr. |
| 5,966,132 A | 10/1999 | Kakizawa et al. |
| 5,968,175 A | 10/1999 | Morishita et al. |
| 5,977,968 A | 11/1999 | Le Blanc |
| 5,982,372 A | 11/1999 | Brush, II et al. |
| 5,987,164 A | 11/1999 | Szeliski et al. |

| | | | |
|---|---|---|---|
| 6,009,190 A | 12/1999 | Szeliski et al. | |
| 6,020,885 A | 2/2000 | Honda | |
| 6,023,270 A | 2/2000 | Brush, II et al. | |
| 6,028,960 A | 2/2000 | Graf et al. | |
| 6,029,046 A | 2/2000 | Khan et al. | |
| 6,030,292 A | 2/2000 | Hirano et al. | |
| 6,031,540 A | 2/2000 | Golin et al. | |
| 6,031,549 A | 2/2000 | Hayes-Roth | |
| 6,054,999 A * | 4/2000 | Strandberg | 345/474 |
| 6,351,265 B1 | 2/2002 | Bulman | |
| 6,919,892 B1 * | 7/2005 | Cheiky et al. | 345/473 |

FOREIGN PATENT DOCUMENTS

| | | |
|---|---|---|
| JP | 1223891 | 9/1989 |
| JP | 3020870 | 1/1991 |
| WO | WO-8909458 | 10/1989 |

OTHER PUBLICATIONS

"Computers of Biblical Proportion," Information Week, edited by Michael Puttre, Jul. 24, 1989, No. 229, p. 36.

MacroMind Director Version 3.0 Studio Manual 4-8, 1991.

Morishima, et al., "A Facial Motion Synthesis for Intelligent Man-Machine Interface," Systems & Computers in Japan, Jan. 1, 1991, vol. 22, No. 5.

Sorensen, "Terminator 2: A Film Effects Revolution," Computer Graphics World, Oct 1991, vol. 14, No. 10, pp. 57-62.

Rivest, "PayWord and MicroMint: Two Simple Micropayment Schemes," May 7, 1996.

"Computers of Biblical Proportion," Information Week, edited by Michael Puttre, Jul. 24, 1989, No. 229, p. 36.

* cited by examiner

FIG.5A
FIG.5B
FIG.6
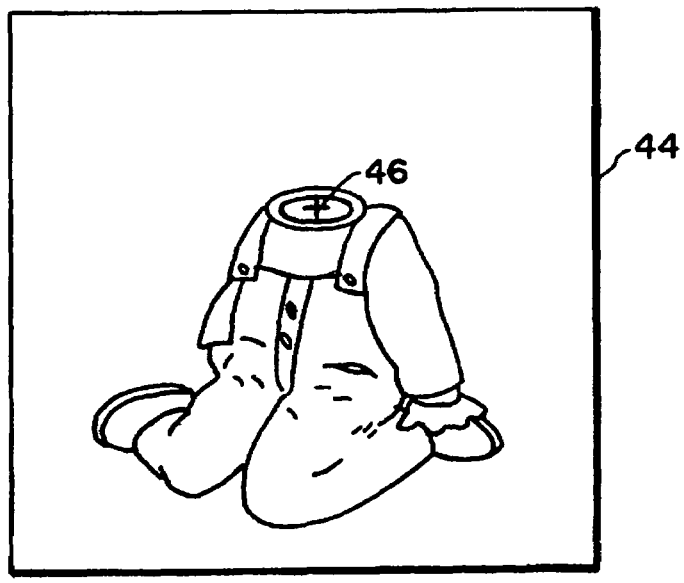
FIG.7
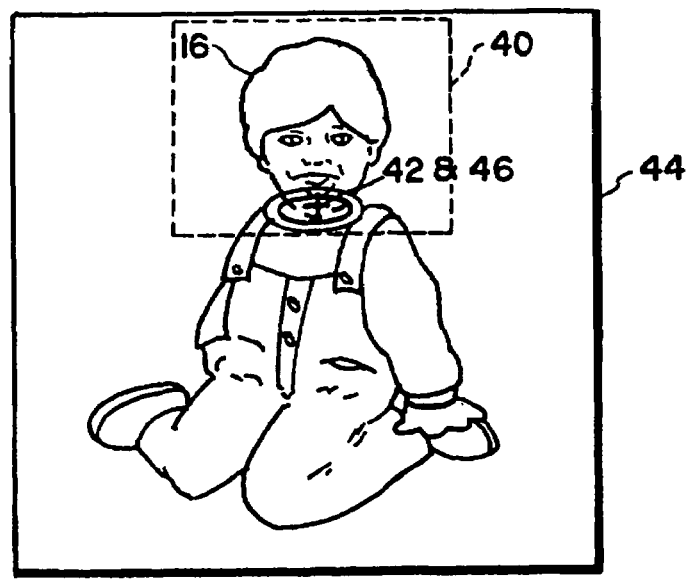

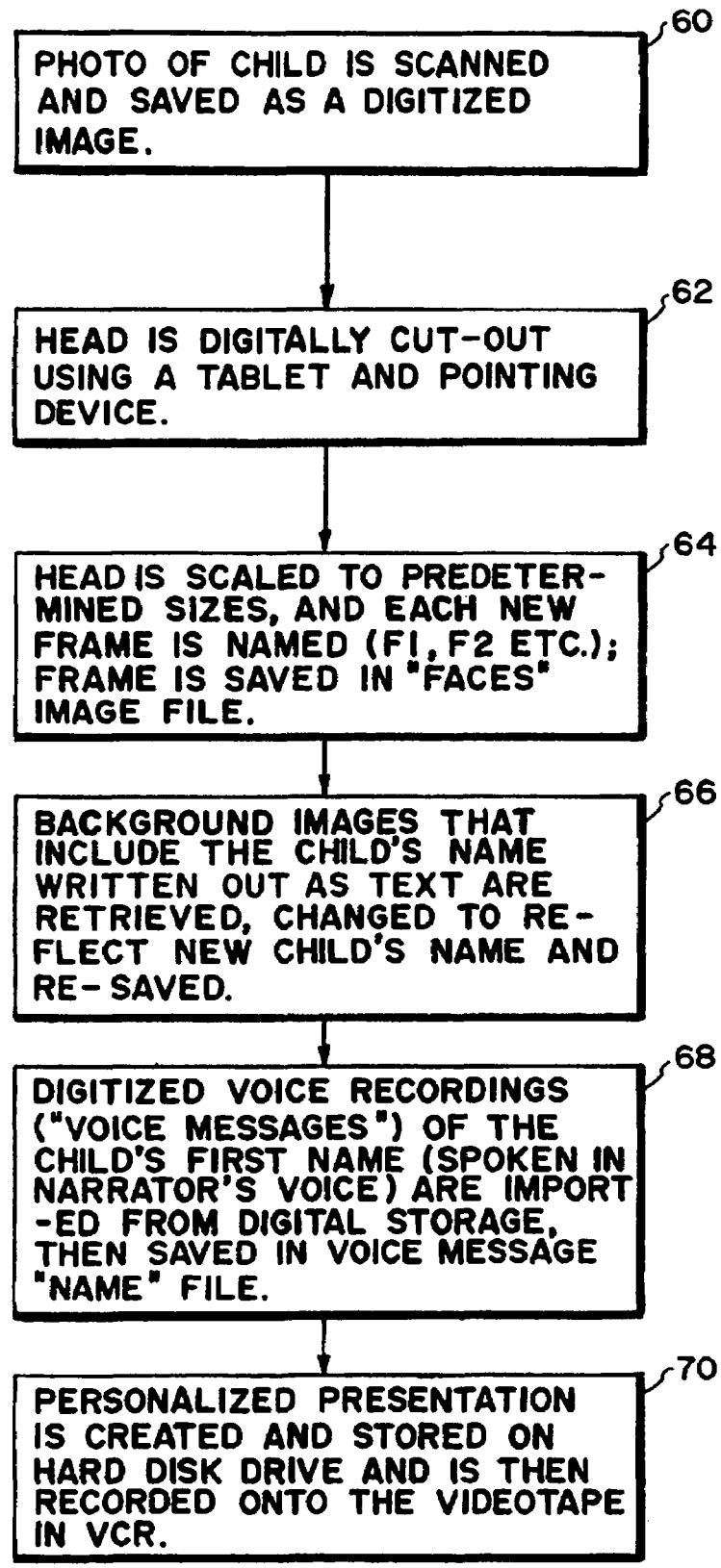

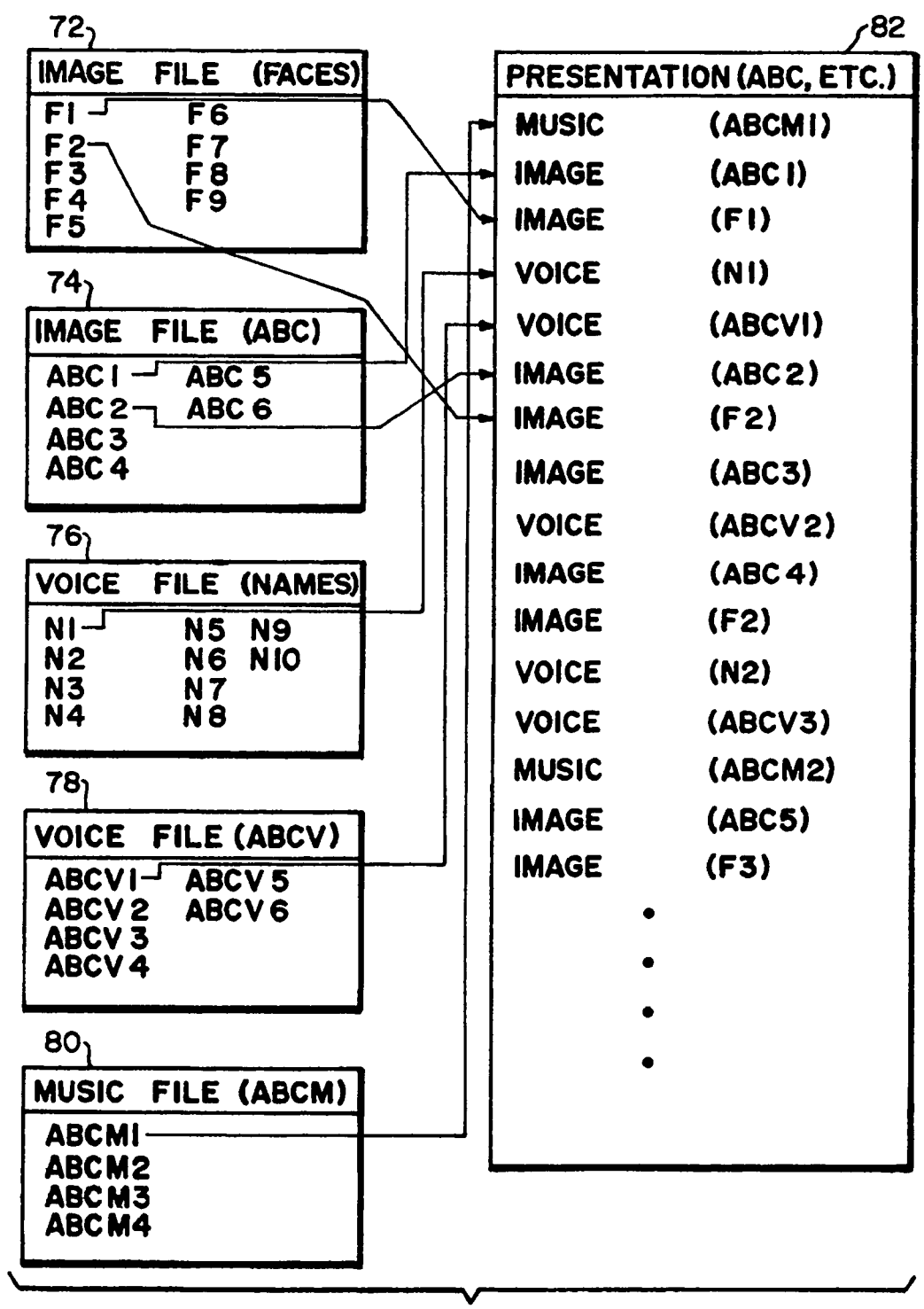

OBJECT CUSTOMIZATION AND PRESENTATION SYSTEM

REFERENCE TO RELATED APPLICATIONS

The present application is a Continuation in part of U.S. patent application Ser. No. 09/300,987, filed Apr. 28, 1999 (pending), which is a Continuation of U.S. patent application Ser. No. 08/840,486, filed Apr. 21, 1997 (abandoned), which is a Continuation-in-part of U.S. patent application Ser. No. 08/489,564, filed Jun. 12, 1995 (now U.S. Pat. No. 5,623,587), which is a Continuation-in-part of U.S. patent application Ser. No. 08/138,531, filed Oct. 15, 1993 (abandoned), each of which is expressly incorporated herein by reference. This application is based on and claims benefit of U.S. Provisional Patent Application Ser. No. 60/300,352 filed Jun. 6, 2001, to which a claim of priority is hereby made.

FIELD OF THE INVENTION

The present invention relates to the field of personalized media presentations, and systems and methods therefore, and more particularly to methods and systems for dynamically merging a foreground image with a choreographed background image.

BACKGROUND OF THE INVENTION

The techniques for merging a set of images or image representations into a composite have been explored for some time. These may be segregated into a number of types: optical, digital two-dimensional, digital three dimensional, and video. Each has developed separately.

Recently, the processing power of home entertainment systems has grown substantially, allowing photorealistic, or nearly so, representations of computer generated objects to be displayed on a television set, including animations which implement physical laws. The software which generates these images and animations is quite sophisticated, and has gone through a number of generations.

Because photorealism is a subjective threshold, and in most cases, the image processing resources available are insufficient to perfectly present each image, the presentations made by these systems necessarily impose tradeoffs. Thus, by properly selecting simplifying presumptions, adequate quality may be obtained within the limits of the processing resources, and further leaving processing resources available for competing tasks.

Television video game systems such as those available from Sony (Playstation 2), Nintendo (Nintendo 64), Sega (Dreamcast), and Microsoft (X-Box), among others, typically include a game player which provides a standard video output. The game player is adapted to receive removable game disks or cartridges, each having a video game program stored therein. The game player includes a processor, which executes the video game program. Input devices such as joysticks or gamepads, permit a user to play the game. These games are typically predefined, and thus no personalization capability is provided, except perhaps persistent storage of game play parameters. Telecommunications systems may be incorporated into the game console, see, e.g., Sega Dreamcast, U.S. Pat. No. 6,030,292 (Hirano, et al.) Feb. 29, 2000.

Since these systems, which are often designed as set top boxes, e.g., an electronic device which is connected to a television set and which provides a signal to the television set, are intended primarily for home entertainment, application software is generally focused on this sphere. As the processing power and available resources increase, these devices are anticipated to assume other functions, including encompassing all set top box functionality, including digital video recording, computer integrated telephony, e-commerce, advertising, content browsing and Internet connectivity, in addition to the traditional gaming applications.

While these platforms are growing in capability, to date they do not provide a high level of customization or personalization. In order to maintain low cost, rewritable memory is minimized, and, for instance, is employed only to persistently store game parameters. Thus, it is difficult to personalize the system, since it is not intended to be a general purpose computing platform or to be easily upgradable, and does not provide user accessible persistent mass storage. This, of course, provide a substantial advantage in terms of system stability, since the manufacturer has almost complete control over the operating system and hardware. A further subtle issue is that programmers of entertainment titles must typically presume that a user has only the minimum hardware and software provided by the manufacturer, and therefore resist reliance on optional components. Thus, even if upgrades are available for the platform, developers tend not to rely on the use of hardware or software upgrades and focus instead on making the most of standard system equipment.

It is known to merge images, such as foreground and background images, to produce a composite image or image stream. It is further known to create a collage of image elements from various sources or from image fragments, to create a composite image. Finally, it is known to interact with an image database to store and retrieve images.

Various systems and methods have been proposed for producing pictures of human subjects with the head of one human being superimposed upon the body of another human being, animal, fish, etc. The superposition is normally accomplished "mechanically" by cutting around the outline of the head of a person shown in a first photograph and applying this head, in the proper position and orientation, to a body in a second paragraph. The resulting "mechanical" is thereafter photographed and/or scanned electronically to produce a third photograph or electronic image. Electronic implementation of this process is also known where the head is electronically traced and superimposed. This superposition process is time consuming and requires that the head and body in the first and second photographs, respectively, be adjusted in scale photographically. That is, that either the first or second photograph is enlarged or reduced so that the head and body are of the same relative size, for example. This superposition process is only rarely used, and when used it is generally limited to situations where the cost of the process is small compared to the cost of the overall desired product.

This superposition process is only rarely used, and when used it is generally limited to situations where the cost of the process is small compared to the cost of the overall desired product.

Steir et al., U.S. Pat. No. 5,060,171 relates to a system for superimposing images. A video image of a head is captured, and a separate hairstyle is overlayed with a translation and scaling transform. See also, U.S. Pat. No. 5,289,568.

It is known to personalize books or images, and book-on-demand publishing technologies are well established. See, U.S. Pat. Nos. 5,729,674, 4,731,743, 4,616,327, 3,982,744 and 3,892,427. U.S. Pat. No. 5,625,579 provides a system for customizing prerecorded video media. A so-called digital dressing room is known, see, U.S. Pat. No. 5,680,528 wherein garments are digitally superimposed on the body type and shape of a user, showing the user's face.

U.S. Pat. No. 5,625,570, expressly incorporated herein by reference, provides a system for customizing prerecorded video media.

A so-called digital dressing room is known, see, U.S. Pat. No. 5,680,528, expressly incorporated herein by reference, wherein garments are digitally superimposed on the body type and shape of a user, showing the user's face.

It is also known to replace a facial portion within an image with an extrinsic facial image. See, U.S. Pat. No. 5,687,306, and references cited therein. U.S. Pat. Nos. 3,398,664, 3,864,708, 4,037,249, 4,052,739, 4,130,834, 4,190,856, 4,240,104, 4,258,385, 4,317,114, 4,357,624, 4,409,618, 4,439,783, 4,463,380, 4,506,289, 5,345,313, and 5,557,179. A montage may also be created of facial image portions. See, U.S. Pat. No. 5,664,690.

Computer generated graphics are well known, as are live video windows within computer graphics screens. U.S. Pat. No. 3,899,848 relates to the use of a chroma key system for generating animated graphics. U.S. Pat. No. 5,384,912 relates to a computer animated graphics system employing a chroma key superposition technique. U.S. Pat. No. 5,345,313 relates to an image editing system for taking a background and inserting part of an image therein, relying on image analysis of the foreground image. U.S. Pat. No. 5,394,517 relates to a virtual reality, integrated real and virtual environment display system employing chroma key technology to merge the two environments.

It is also known to scan photographs electronically, which may be used to produce customized portraits on self-adhesive paper labels. It is also known to print a plurality of portrait photographs in a variety of sizes on photographic paper.

Known systems for accounting and payment for on-line transactions include credit and debit card transactions, direct deposit and wire transfer, Micro Payment Transfer Protocol (MPTP), Millicent (Compaq Computer Corp.), and a number of other systems. Typically, these systems seek to provide secured transactions, to ensure to some degree of reliability against the risk of non-payment.

A known system for presentation of multimedia presentations through Internet protocols is the Synchronized Multimedia Integration Language (SMIL) Boston Specification (W3C Working Draft 3 Aug. 1999).

U.S. Pat. No. 6,029,046, to Kahn et al. relates to a system for recording set top box software, received over a broadband communications link, in local memory. Thus, it is well known to provide addressable set top boxes for selective delivery of media content and accounting therefor.

There exists a need in the art to provide a process for personalizing, using sophisticated and high quality data, video games and other content for use with a set top box, through efficient means.

SUMMARY OF THE INVENTION

The present invention relates to a number of aspects. These include the customization of images and multimedia presentations, computer-assisted image processing, and systems involving and employing the resulting images, audio recordings and linear and non-linear multimedia presentations. Another aspect provides a method and apparatus for providing remote access and image retrieval of an image or customized from a centralized database. Another aspect provides an integrated accounting system for accounting for the images. A further aspect provides an automated framing system receiving on-line orders. A still further aspect provides an on-line photographic album presented in a manner defined by a user.

Customization Of Presentations

One embodiment of the present invention relates to a method and apparatus for producing a series of electronic images of an animated figure having at least two body portions, wherein a first body portion from one source is automatically combined in anatomically appropriate fashion with a second body portion from the same or different source. The series of electronic images may then be further combined with other images.

In the following description, the term "head" is intended to include not only the head of a human being with its hair (however long) face, ears, etc., but also any and all appurtenant accessories such as a hat, glasses, hair adornments, jewelry (earrings, etc.) and the like. The term "body" as it is used herein, is intended to include the body of a human being, animal, fish, etc., (either real or fictional, animated or photorealistic) including not only the torso, arms, legs, tail, fins, etc., but also any and all appurtenant clothing, shoes, jewelry, and the like. The image of the head and/or body may be obtained from a "real" head or body, respectively, either photographically or by electronic image scanning, or from an artistic or computer generated rendering thereof.

In fact, the techniques discloses herein may be advantageously employed with numerous objects, wherein a generic object or portion of an object is customized or personalized by the addition of an extrinsic element. These may be audio, visual or multimedia objects, and techniques are provided herein for the various types.

According to one embodiment, the present invention provides a method and apparatus for computer-assisted image processing, as well as for the use of the resulting images. For example, an image or multimedia template is provided, which for example may include a full background presentation, which is merged upon presentation with foreground image and/or multimedia data. In a more sophisticated embodiment, the template comprises one or more models of the presentation, in which parameters are provided. External data may then be provided to supplement, modify and/or control the models. The presentation may be generated on a server and the resulting media stream sent to a client, or the template and external data merged at the client machine and presented to a user or recorded for later viewing.

The present invention also provides methods and systems for the customization of images, audio recordings and linear and non-linear multimedia presentations. The present invention provides a range of solutions for the customization of media streams. For example, audio and/or video overlays may be provided to customize a predefined background presentation. A template is provided to define the spatial and/or temporal insertion, as well as other parameters.

In some cases, such as video games and interactive media, the background content is not fixed or scripted, but may vary based on user input or other dynamic conditions. In this case, the present invention preferably provides real time or near real time rendering of the composite or customized images.

One embodiment of the present invention provides a method and apparatus for producing an electronic image of an animated subject in which the head of one subject is automatically superimposed upon the body of another subject, which may be a person, animal, fish, etc.

Another embodiment of the invention provides a system and method for producing an electronic image of an animated subject in which distinctive characteristics of a portion of one subject are imposed upon or integrated within a model of the corresponding portion of another subject or a generic subject. Thus, the model may be modified with the characteristic parameters. Typically, these parameters or characteristics are extracted by analysis of an image of the subject.

It is a further object of an embodiment of the present invention to provide a method and apparatus for producing an electronic image of a combination of a head from one subject and a body from another subject, which is substantially less time consuming and less costly than the superposition process known heretofore.

A preferred resulting multimedia sequence will therefore include background material in both the video and audio sequences, which has been modified and/or customized based on individualized or personalized inputs. Because the background material may comprise the bulk of the production content, this system allows and facilitates customization of multimedia productions with a relatively small customization information input. Further, because the production may be modularized, with one or more levels of customization, a high degree of flexibility is available for relatively low cost and effort per custom multimedia production. Thus, each output multimedia production may include a selected subset of the available background material.

In forming the customized image, a subject foreground image portion, such as a head, will be provided in electronic form to a computerized system. This subject foreground image portion will then be matched to another subject portion, which may be an external input, or selected from one or more stored other subject portions, such as human, animal, insect, alien, or "cyborg" bodies. The subject foreground image portion is then normalized in position and size, and optionally angled and 3-D orientation projected, and merged with the other subject body portion to create an anatomically appropriate entity.

The foreground image portion or suitable description thereof, may be provided to the presentation system in various ways. Typically, in order to obtain a high quality and aesthetically pleasing result, the foreground image is manually prepared. Alternately, automatic image preparation methods may be used, as are known in the art. The foreground image portion may be formed directly on the presentation system, such as by scanning an image, capturing a video image, or the like. The presentation system may, in this case, include facilities for manually or automatically preparing the image by separating background elements therefrom, or extracting characteristic parameters. Manual methods typically require the user to define an edge of the desired image, as well as one or more landmark features. Automatic techniques typically seek to use chroma key techniques or other background identification in techniques, or edge detection techniques, to separate the desired image from the background. The eyes or pupils thereof, for example, are detected using standard techniques. The nose and mouth are then located. Cheeks, ears, and hair line and other anatomical features are then identified, it visible. According to one embodiment, the extracted head is employed as an image component. According to another embodiment, a series of images are analyzed co synthesize a three dimensional representation of the head of the subject. According to a third embodiment, one or more images of the subject are analyzed to extract distinctive or characteristic parameters, which are subsequently used to control a model for presentation.

The subject image may also be captured and automatically processed in a kiosk, for example in a retail center, and delivered to a user by means of a non-volatile memory cartridge, magnetic or optical disk storage, or other format.

A central facility may also be provided, receiving subject images for processing, by a manual, automated or hybrid process. In the later case, an advantageous information delivery method comprises electronic delivery, such as through the Internet, an intranet or virtual private network, or on-line service. Broadband delivery is also possible, for example in a broadcast mode, with addressed, encrypted packets. Alternately, a switched packet network technique may be employed to deliver the information.

The personalized or custom information is then employed in the production of a customized or personalized presentation. Typically, the image is animated by a combination or scaling, rotation and translation for two-dimensional representations, and a full suite of three dimensional movements, (six axis plus scaling) for three dimensional models.

In the case of a simple two dimensional image representing an anatomical portion, one or more reference points (or vectors) are defined, to allow standardized control over positioning. Control over presentation of a two dimensional image preferably comprises positioning information including a single point, and a scaling factor. The image, in such a case, is presumed to have a predetermined anatomical orientation, i.e., the angle and 3D-orientation projection are already normalized to a sufficient degree. However, the positioning information may also include one or more vectors defining one or more additional degrees of freedom for normalization, comprising information relating to a three or four dimensional representation of the anatomical portion. Thus, the set of representations defining the transformations of the image of the anatomical portion in the resulting presentation relate to the positioning, scaling, movement, or other characteristics of the anatomical portion, and optionally orientation and other factors.

The presentation may be scripted or dynamically generated. In a preferred dynamic embodiment, a figure is generated as an algorithmic model and the image rendered on a real time basis. Such real time rendering techniques are similar to those employed in video games. A three dimensional model or surface texture of a personalized or customized subject is then applied to an otherwise generic or nonspecific model of a figure. Together, the generic or nonspecific model and the three dimensional model or surface texture of the personalized or customized subject are animated and rendered, preferably in photorealistic fashion, according to the desired dynamic sequence. See, U.S. Pat. No. 4,521,014 (Sitrick) Jun. 4, 1985, and U.S. Pat. No. 5,553,864 (Sitrick) Sep. 10, 1996, U.S. Pat. No. 5,724,497 (San, et al.) Mar. 3, 1998, U.S. Pat. No. 5,771,046 (Izawa, et al.) Jun. 23, 1998, U.S. Pat. No. 5,774,125 (Suzuoki, et al.) Jun. 30, 1998, U.S. Pat. No. 5,852,672 (Lu) Dec. 22, 1998. U.S. Pat. No. 5,870,101 (Murata, et al.) Feb. 9, 1999, U.S. Pat. No. 5,912,671 (Oka) Jun. 15, 1999. U.S. Pat. No. 5,933,148 (Oka, et al.) Aug. 3, 1999, U.S. Pat. No. 5,933,153 (Deering, et al.) Aug. 3, 1999, U.S. Pat. No. 5,945,997 (Zhao, et al.) Aug. 31, 1999, U.S. Pat. No. 5,947,823 (Nimura) Sep. 7, 1999, U.S. Pat. No. 5,963,668 (Horikawa, et al.) Oct. 5, 1999, U.S. Pat. No. 5,966,132 (Kakizawa, et al.) Oct. 12, 1999, U.S. Pat. No. 5,987,164 (Szeliski, et al.) Nov. 16, 1999, U.S. Pat. No. 6,009,190 (Szeliski, et al.) Dec. 28, 1999, U.S. Pat. No. 6,031,540 (Golin, et al.) Feb. 29, 2000.

The electronic representation of the subject portion, e.g., head, may be a single image, multiple still images of differing orientations, a video input, or a special standardized input from a subject for acquiring full information about the subject. Therefore, the present invention allows various types of input sources to be used to define the subject. This flexibility is defined in a different production level than the "story line", although the type of electronic representation employed may be used to modify certain customization features. For example, if the input is a single still image, the audio track and corresponding image may reference the "stiffness" of the subject. Likewise, where a full model of a subject is created, the final multimedia production may include scenes including exploitation of, or verbal references to the ability of the computer to fully animate the subject.

Assuming that a full model of the subject is not obtained, the merging process may be a simple superimposition of the custom image information defined by a set of representations, or a more complex process, such as "morphing", which allows a gradual transition between two images. Where the electronic representation of the subject portion is an algorithmic model of the subject, the objects with which it most closely interacts are preferably also models, so that a simple or complex formula may be used-to form the final image of the combined subjects.

The resulting image is preferably output to a video recording device and/or displayed on a video monitor.

The animation of the subject typically consists of synchronizing the size and position of the subject's static head/face to the size and position of a pre-animated body. However, it is an object of the invention to enhance the visual aspects of this type of personalization by further animating the subject's head and face in order to synchronize the specific facial and mouth movements with a set of scripted expressions and mouth movements. This is accomplished by associating specific points on the subject's head and face with corresponding points on a "master" subject's head and face (i.e. a generic model head and face), and then applying instructions for movement to those points that correspond with the movements of the "master" subject, resulting in a set of movements and expressions that correspond to the movements and expressions of the master subject. These movements and expressions represent appropriate interactions with, and reactions to, the visual and auditory context in which the subject appears (e.g. a Barney(r) video title, a sporting event video, an interactive game). This type of personalization is not limited to the face, but may also include the subject's entire body, to which this process is similarly applied.

The foreground image need not be directly derived from the input image, and may be "tweened", i.e., formed as an interpolated image from two different images, "morphed", i.e., provided with a gradual transition between two or more extremes, or altered before combining or superimposing on the background image. See, U.S. Pat. Nos. 5,850,463, 5,057, 940, 5,375,195, 5,668,595. Therefore, if the background image is the body of a lion, such as "The Lion King" (Simba), the face of a child may be captured and altered to include lion-like features. In other scenes, the background image sequence may be of "The Beauty and the Beast", where the child may be merged with one of the characters being altered to include relevant, consistent features. Likewise, color mapping may also be altered to suit the production, allowing the subject to change color or shade in synchronization with the background.

Where a desired facial expression or orientation is not included in the first image information, it may be interpolated or extrapolated therefrom. Thus, the face image information may be mapped onto a three dimensional generic facial model, and then projected into different orientations. Further, facial features may be animated to produce facial expressions not included in the original data set(s). Thus, the information used to construct the final output image need not be limited to size and position, and may be a more complex vector with temporal variations. While it is preferable to obtain actual images of the subject rather than generating such images, both methods may be used.

Where available, video images including facial expression changes, such as between smile and frown, open and closed mouth, neck turning left and right and up and down, provides source material to produce more realistic images, allowing the image to "come to life" in the resulting video in a visually dynamic fashion.

According to one embodiment of the present invention, the final merging process occurs in real time. Therefore, it is preferred that before the final merging process occurs, all necessary preprocessing is completed, which may include interpolations, "morphing"modeling. "tweening" and the like. Certain tasks which are not completed in real time malt be processed concurrently with the final merging process, so long as the tasks are assured to complete before the resulting data is required for merging. Thus, in a preproduction stage, images are input into the system and are parameterized and preprocessed, to extract the desired portion of the subject and position and scale it. As discussed above, some functions may be performed in a batch mode before program execution. These include the foreground image extraction, optional model formation, interpolation and digitization.

Interpolation between two different images of the same object may be performed by "tweening", a process wherein intermediate stages of transformation are created which maintain morphologically constant features and create a morphological "compromise" or intermediate for features which differ. For example, a transition between smiling and frowning may be partitioned into a number of intermediate stages in which the mouth and cheek morphology gradually changes from one extreme to the other.

Audio personalization techniques typically include the insertion of a subject's name, spoken in the voice of a context-appropriate character (e.g. Barney(r) the dinosaur), into the an audio soundtrack. Alternately, the voice characteristics of the subject may be captured, and used to define the voice of a character in the presentation. Thus, a model of the character's voice may be used in conjunction with a voice-characteristic appropriate text (or phoneme identifier)-to-speech converter. By using speaker dependent and speaker independent voice analysis techniques, it is also possible to convert speech spoken by one individual into speech sounding like it would be spoken by another individual. Thus, by modeling the speech characteristics, the variable parameters may be extracted from a first model and applied to a second model to effect a change in character voice.

This technique therefore allows audio personalization by capturing a sufficiently broad sample of a subject's voice (for example by telephone, transmitted voice or sound file, or recording), and using the unique auditory properties of the subject's voice sample to digitally analyze phrases spoken in the voice of the subject that correspond to the scripted spoken dialogue from video or audio content (e.g. a Disney home video, an interactive game, etc.) This allows the subject to apparently speak all of the dialogue of, for example, a feature live-action or animated film without having to record the entire script, and without having to master the subtleties of vocal performance.

Another possible form of audio personalization consists of a consumer composing a script for a presentation (video, online photo-album, interactive game) that is spoken in a character voice. For example, the consumer could create an online photo album presentation that could be narrated by Winnie the Pooh. Therefore, in this case, a text to speech converter assembles written words into a character spoken dialog, or a composite or prerecorded spoken selections and customized selections.

The background image according to the present invention may be video, animated images, or still images. The background image includes the remaining portion of the subject. A further background image may also include external elements, and may optionally be integrated with the background image incorporating the remaining portion of the subject. For example, in a totally animated background, a single background image, including both the remaining portion of the subject and other elements is efficient. However, where the external elements are video images, and the remaining portion of the subject is animated, it may be preferable to treat the two background images separately. Thus, a plurality of background frames may be merged under computer control into a single video.

In a dynamically generated presentation, all components may be generated together: the focal subject, background, and any other subjects. In this case, the imposed distinctions are moot, and indeed, a plurality of objects within the presentation may be customized or personalized.

Likewise, the audio information may include three (or more) components, the custom audio insert, such as a name or other appropriate utterance, the audio template, and background audio, such as music or sound effects. These three components may be merged in real time during the production stage. Dynamically generated audio may also be provided, wherein components of the audio program are generated simultaneously, without distinction between custom insert and template.

With a modular design of production, subject information from a variety of sources may be efficiently and optimally incorporated into the production. Thus, the subject image may be one or more photographs, video, or taken directly at the production site from the subject itself. Music and voice may be included, as well, from previously prepared recordings or a microphone during batch processing preparation. Custom graphics and the like may also be optionally included.

According to an alternative embodiment of the present invention, the subject image information is first processed to produce a cartoon-type image. This may be performed by a caricature or cartoon artist using standard materials, by an automated processor, or by an operator assisted automated processor. In creating a custom cartoon image, the anatomical integrity of the image should be grossly maintained, so that the head portion may be successfully merged with the body portion during production. Thus, artistic freedom is generally limited to anthropomorphically appropriate elements and dimensions for proper computerized identification. The cartoon image process is advantageous, because it allows simplified modeling of the subject without imposing the same difficulties as photorealistic imaging of a natural subject. Mouth, eyes, nose, hair and eyebrows may all be modeled as three dimensional objects and controlled to move in real time, allowing fluid movements of the two dimensional projection of the character in the final production. The use of a human artist to abstract human facial features and create a caricature allows a high level of customization while providing means for standardization. Thus, certain features may be accentuated based on information not available in an image alone, resulting in an enhanced customized production.

When a human artist assists in capturing the features of the subject, a picture may be drawn, which is then scanned into a computer as the first image. Alternatively, the image may be created on a digitizing tablet. Further, the artist may work using a mouse or other input directly with a video image to construct the first image. The artist-created image is then employed directly or further processed by the computer, such as by being applied to a model cartoon character. When the artist works interactively with the computer to generate the first image, the data may be entered directly into a model, which may be directly animated, or have model parameters varied.

In a scripted production, in many instances, the background image need not be employed as a digitized image, except for genlock (video scan synchronization) and overlay, at any point in the processing, and therefore in large part passes without distortion from a source to the production. This allows the background image to be stored on video tape, laser disk, or other analog storage medium. Of course, the background may also be stored as digital video, in uncompressed or compressed form, e.g., MPEG-2. Production synchronization may be by way of standard SMPTE timecodes. Thus, a custom cartoon character may be overlayed on external elements of a background.

In a preferred embodiment according to the present invention, audio information is provided, including both an audio portion associated with the personalized or custom image information and another audio portion associated with the generic or uncustomized background image. A set of audio representations associated with the background image is used to determine the timing and optionally characteristics of information from the customized audio information in a resulting soundtrack created by merging with the background audio information.

The personalized or custom audio information may be, e.g., a name, spoken in various intonations, associated with the first image information. The background audio information may be, e.g., a story associated with a sequence of background images, with the set of audio identifiers relating to the timing and intonation of the name to be inserted in the soundtrack.

In a dynamic presentation, the audio processing follows a similar pattern, with most of the audio information provided as a standard part of the content, and a small portion customized as either short recorded passages or acoustic parameters.

The present invention is not limited to customized analog video presentations, and therefore may encompass digital video that is, for example, played back in linear form over the Internet, delivered to a set-top box for linear playback, or viewed interactively in a non-linear fashion.

Presentations may also be delivered on recordable media, such as audio or video tape, recordable DVD or CD, or other medium types.

One aspect of the present invention provides an interactive computer-based entertainment system which interacts with a user, and which may be personalized for the user. Preferably, the personalization includes an image and/or audio information, but may also be personalized in other manners. Thus, content delivered and presented to a user is not limited or constrained by the information available to the programmer.

For example, an image or representation of the user or third person is provided to the set top box, for example by memory card, telecommunications link, boot disk, or captured through a camera or scanner. This image may then be incorporated into the content, in various ways. Preferably, this image or representation is dynamically adjusted to be appropriate for the context. Thus, it is preferably scaled and translated as necessary. Further, the image or representation may be included in a multidimensional model, allowing a full range of rendering options, including rotations. Further, the model itself may be subject to alterations, such as to morph the image in a desired manner.

Preferably, one or more images of a subject are captured and digitized. For example, a portrait image is then cropped to separate the head of the subject from any background. Typically, the body is also separated. This image may then be used directly, scaled and translated within the output image as appropriate. It has been found that the human brain perceives a facial image that is distorted by differential scaling along a vertical and horizontal axis as being rotated, especially during a rapidly changing dynamic presentation. Thus, pseudo three dimensional effects may be obtained without true processing of the image to a higher level of dimensionality.

On the other hand, high quality and slowly varying presentations require 2½ (surface map) or 3 (volume) dimensional processing in order to achieve high quality photorealism. It is possible to convert a set of two dimensional images into a higher dimensionality model bye mathematical processing, especially when mapping the two dimensional image onto a generic framework. Thus, by identifying facial landmarks, it is relatively easy to map the eyes, nose, mouth, ears, hairline, and the like, of a captured personal image to a generic model. Then, by maintaining the surface mapping while animating the model, a photorealistic animation results.

In fact, most video game systems employ just such techniques in their normal generation of non-customized imagery. A wireframe or other type of physical representation of the figure is provided, with a "skin" mapped onto the wire frame. The control points of the wire frame are then adjusted according to an animation sequence, with the skin rendered according to the projected view.

Thus, according to one aspect of the present invention, one or more images of a person or object are analyzed for correspondence with a generic model. Regions of the image are then associated with corresponding regions of the model. The model is then manipulated, with the associated regions of the image manipulated accordingly.

According to another aspect of the invention, instead of mapping the image of the person or object to a model, a set of parameters are extracted from an image, which are then applied to a model. In this case, many more parameters may be varied. Further, in this case, a variety of rendering techniques may be employed distinct from texture mapping. Advantageously, the entire image is created using parametric models, thereby allowing enhanced degrees of freedom and dynamic photorealism without artificial constraints.

The Sven Technologies Adaptive Image-based Surface Texturing (AIST), found in their application SurfaceSuite, a 3D Studio MAX plug-in, is capable of texture mapping of images to provides photorealism. SurfaceSuite, for example, readily allows an unretouched photo to be mapped onto a head mesh.

For example, using this software, a set of control points are laid down on major landmarks of a picture (the eyes, the nose, the corners of the mouth, etc), and then a set of corresponding points on the mesh are laid down. The texture is then stretched and warped to map it precisely according to the control points.

According to another aspect of the present invention, a method for interacting with a user of an entertainment system, in which the user has user characteristics, and which entertainment system presents to the user an interactive show comprising audio, video images and computer-generated graphical images, comprises the steps of receiving user input signals indicative of user input actions: presenting user output signals to the user, which user output signals are indicative of the audio, video and computer graphical images generated by output devices: receiving the user input signals: generating, in dependence upon the user input signals, database signals which are indicative of an informational record of the user, which informational record is indicative of user characteristics which serve to uniquely identify the user: generating a first set of show control signals indicative of the audio, the video images and the computer-generated graphical images of the show: receiving the user input signals, the database signals and the show control signals, and generating in dependence thereupon activity server signals for directing presentation of the user output signals by the user interface means; and generating, in dependence upon the activity server signals, a second set of show control signals indicative of the audio, the video images and the computer-generated graphical images of the show which are adjusted in accordance with the user input actions.

On Line Multimedia Presentations

A method and apparatus is also provided for remote access and image retrieval of an image or customized from a centralized database. Therefore, a plurality of data records are stored in a central database. A script or template is defined for defining the temporal, spatial, affine, and other characteristics of the data presentation. The script or template may define a plurality of objects, which may be synchronized, simultaneously presented, or sequentially presented. The database may be composed of public or sets of private objects, such as photographs. Advantageously, a rights management system is provided to facilitate, for example, controlled commercial use of objects belonging to third parties, and for financially accounting for such use. A micropayment system may be provided for such purposes, as described in more detail below. A micropayment system differs from a regular payment system in that risk of, non-payment or non-delivery is relatively increased in favor of reduced transaction cost and clearance latency. Of course, a regular payment scheme, such as credit card or electronic funds transfer may also be employed as desired. See, U.S. Pat. No. 5,634,012 (Stefik, et al.), and U.S. Pat. No. 5,629,980 (Stefik, et al.) May 13, 1997, U.S. Pat. No. 5,638,443 (Stefik, et al.) Jun. 10, 1997, U.S. Pat. No. 5,715,403 (Stefik) Feb. 3, 1998. U.S. Pat. No. 5,968,175 (Morishita, et al.) Oct. 19, 1999.

The present invention also provides an on-line multimedia content, such as a photographic album or multimedia clip or presentation database, in a suitable manner for use by the user at a remote location, such as his home. Typically, the media objects are stored in a centralized database, although this database may be distributed or even physically located within a privileged storage portion of the user's local storage, depending on the various constraints. This database may be manually or automatically "scripted", meaning displayed and subjected to modifications.

In some instances, the user customization will not encompass personalization, but rather the selection of desired content. This content may be selected by semantic or content-based query techniques, or through other means. In some instances, the content selected by the user will be subject to rights management rules, which are preferably implemented by the content browser, telecommunications, and presentation systems. See, U.S. Pat. No. 5,893,110 (Weber, et al.) Apr. 6, 1999.

An automatic scripting scheme (e.g., a video game presentations) is available, for example, from a Sony Playstation 2, Sega Dreamcast, Nintendo 64, or like consoles. These systems, with appropriate telecommunications or data retrieval systems, are able to employ the multimedia data or parameters in synthesizing a composite presentation. Preferably, the stored or transmitted data is presented in a native format (or compressed representation thereof) of the console or software system operating on the console, in order to minimize format translation latency and overhead. The objects may be downloaded in a batch mode prior to presentation, as needed, on a predictive basis, or in other known fashion. For example, the Sony Playstation 2 has megabytes of RAM bus memory, and optional 8 megabyte memory cartridges. The stored multimedia data may encompass, for example, tens, hundreds or more megabytes of stored data. Therefore, it would be generally unsuitable to download all of the data at once. On the other hand, even with high bandwidth telecommunications; real time delivery of data would likely be subject to impairments and artifacts. Therefore, a combination of predictive downloading of objects and caching of data, into main system memory, cartridge memory, or other storage, for example Sony i.Link (IIEEE-1394) or Universal Serial Bus (USB) storage peripheral, might be preferable.

Content for home entertainment systems such as video game consoles is typically produced in mass quantities, for low manufacturing and distribution costs. This, however, makes customization and personalization within the same manufacturing and distribution infrastructure difficult.

While one embodiment of the present invention provides a relatively small degree of customization or personalization of content, the basic methods are not so limited. For example, a software developer may design a system for integrating personal images, audio and events, within an interactive theme-based schema. This may be a trip to Disney World, Disney Land, MGM Studios, Bush Gardens, or the like. This presents the possibility for three levels of customization. At a first level, the particular theme is integrated with the "engine", i.e., the software constructs which provide for presentation and interactivity. This level of customization may be integrated within the software, or provided separately. This level of customization, for example, provides map and layout, background, attractions, characters, and other static features of the theme. At a next level of customization, particular dynamic aspects of the experience are present. Thus, on a theme park visit, not all attractions might have been visited: special attractions may have occurred, and other such variances from a generic experience are defined. These typically cannot be predicted or adequately described at the time of authorship, and thus would be difficult to integrate into the product as sold, unless provided as a one-off or customized storage media. Finally, at a high level of customization or personalization, the faces, personalities, and extrinsic input from the user is provided. In fact, at this level of customization, arbitrary substitutions, additions and alterations may be applied, even after production. Typically, therefore, this level of customization or personalization requires an extrinsic data source. It is noted that, in some instances, the production may be transmitted to the user on demand, and therefore each content use may be individually customized, however; this poses difficulties in available communications bandwidth, and imposes a particular business model for sale and distribution of content.

Thus, for example, a custom content production may be available for a particular theme park, for example sold as a souvenir. Visitors may have personalized information captured and processed for integration within a custom content presentation, representing the user experience, or take standard photographs, for example at particular portions of the theme park, or both. These images may then be integrated on-site, or processed and made available by mail or on-line. Thus, visitors to Disney World may purchase a "Disney World" game, which is then customized with actual user images and dynamic visit experiences. Photographs taken by or of the user may be uploaded to an Internet web site (typically with password access for privacy), and processed for integration within the content presentation. Prior to or simultaneously with the user seeking to experience the souvenir content, the display console communicates with the Internet web site to retrieve the customization data. This may be used interactively, without a persistent download to the user's console, or downloaded once and stored locally.

The Internet web site may also have other uses, such as an on-line photo album, making use of the same source content. The source content may be manually or automatically processed to produce the appropriate objects for integration. For example, a user may amass a set of objects in an on-line album. He may then choose certain objects or portions thereof for processing and integration within a content presentation. These are then flagged for processing, and when complete, provided to the user. A set of skilled operators may be provided to manually process images quite rapidly, for example while the user waits on-line, with good results. Likewise, automated processing may occur in real time, or even in advance for all objects.

Further, a user may make the souvenir content available to others, by providing the identification and password. Thus, the customization may be shared. In fact, groups may share the customization by selecting a plurality of customized content files, which may be integrated into a single presentation.

In a further embodiment, the technique of customization may be applied may be numerous times to create multiple characters, for example to establish a virtual sports team. See. U.S. Pat. No. 5,846,132 (Junkin) Dec. 8, 1998.

These same aspects may also be employed in open dynamic content sharing systems. Thus, users may define and add objects to a content presentation, available through a shared communications medium, for use by others. These may be customized not only with respect to image and audio properties, but also with respect to capability, personality, intelligence, and the like. See, U.S. Pat. No. 6,031,549 (Hayes-Roth) Feb. 29, 2000. These may also be avatars, controlled remotely by the originator, or autonomous objects. An avatar is a graphical personification of a computer or a process that's running on a computer. Often, a user will seek to provide a personal picture incorporated into his avatar. See, U.S. Pat. No. 5,736,982 (Suzuki. et al.) Apr. 7, 1998. U.S. Pat. No. 5,793,382 (Yerazuni s. et al.) Aug. 11, 1998, U.S. Pat. No. 5,802,296 (Morse, et al.) Sep. 1, 1998, U.S. Pat. No. 5,880, 731 (Liles, et al.) Mar. 9, 1999, U.S. Pat. No. 5,884,029 (Brush, II, et al.) Mar. 16, 1999, U.S. Pat. No. 5,907,328 (Brush II, et al.) May 25, 1999, U.S. Pat. No. 5,909,218 (Naka, et al.) Jun. 1, 1999, U.S. Pat. No. 5,923,330 (Tarlton, et al.) Jul. 13, 1999, U.S. Pat. No. 5,926,179 (Matsuda. et al.) Jul. 20, 1999, U.S. Pat. No. 5,956,038 (Rekimoto) Sep. 21, 1999; U.S. Pat. No. 5,956,039 (Woods, et al.) Sep. 21, 1999, U.S. Pat. No. 5,963,217 (Grayson, et al.) Oct. 5, 1999; U.S. Pat. No. 5,966,130 (Benman, Jr.) Oct. 12, 1999, U.S. Pat. No. 5,977,968 (Le Blanc) Nov. 2, 1999, U.S. Pat. No. 5,982,372 (Brush, II, et al.) Nov. 9, 1999, U.S. Pat. No. 6,020,885 (Honda) Feb. 1, 2000, U.S. Pat. No. 6,023,270 (Brush, II, et al.) Feb. 8, 2000.

The personalization may be predetermined, additive or adaptive. By additive, it is meant that objects or attributes may be accrued within the stored database. By adaptive, it is meant that the system learns through use, and thus the database changes over time.

Preferably, such environments are subject to manual or automated filtering, either centrally or locally. Thus, a user may seek to prevent objectionable content from being integrated within a presentation. By filtering the objects, a greater efficiency is achieved than filtering the presentation, and further, at the time of presentation it may be too late.

Thus, the present invention provides tools, systems and methods for interactive customized gaming applications and the like, for personalization of objects for personal user and for sharing with others.

Often, when objects are shared, a client-server architecture is preferred to a peer-to-peer architecture, since peer communications bandwidth is more variable, and has competing communications processes. On the other hand, servers may typically maintain sufficient bandwidth and quality of service for multiple competing tasks. Thus, even if a user downloads his own personalized objects, the objects belonging to others are typically not persistently downloaded unless specifically addressed to the user. Therefore, a communications link and on-line service would typically be preferred in public interactive content schemes. See U.S. Pat. No. 4,572,509 (Sitrick) Feb. 25, 1986.

Typically, the presentation is created automatically or manually. In the manual system, the user creates a template or script for the display or presentation of these objects on a remote client system. The template or script may be executed either on the client system or the database server, and may involve use of one or more objects simultaneously or in synchronism Typically, when media objects are involved, two classes of issues arise. First, the latency of the server in transmitting the object and of the client system in rendering the object. Second, the time necessary to transmit the object from the server to the client. These two factors may, in large part, dictate dynamic parameters of the template or script. However, the template or script may also be provided to "hide" or otherwise make the latency and transmission delays acceptable. Thus, while a second image or media object is being downloaded, a first (previously downloaded) image or media object is presented. Typically, the download does not require massive processing, therefore interesting or rich effects may be programmed to accompany the presented object. For example, images may be programmed to pan, zoom, or otherwise alter during presentation. Background or customized audio may be presented simultaneously. Normally, Joint Photographic Experts Group (JPEG) format images are transmitted and subsequently render from upper left, line by line, to lower right. However, according to the present invention, this format may be modified to allow rendering, for example, vertically from left to right, allowing a horizontal scroll of an image while it is being downloaded and subsequently rendered.

These scripts or templates may also define integration of objects, for example foreground and background audio and video, for customization of a presentation. The foreground and/or background objects may be stored locally or centrally. Advantageously, objects are buffered in a local cache, easing the transmission delay burden. See, U.S. Pat. No. 5,880,737 (Griffin, et al.) Mar. 9, 1999.

The present invention therefore provides customized templates for adding an external image to a stored video sequence, resulting in a different production for each separate customized input set. Likewise, audio information may be used to customize a stored audio sequence, in conjunction with the video sequence. On a more sophisticated level, the input image information need not be limited to a single image, such as a photograph, and may in fact be obtained from a number of still images, individual frames or frame sequences from a videotape, or specialized imaging for the purpose of creating a computer model of the subject. Thus, a number of facial orientations, expressions and transitions may be captured explicitly for the purpose of creating the production. In this case, a first digital representation includes complex information and a set of second representations includes not only the position and size of the portion of the subject, but the complex information as well. A set of third representations also includes an identifier of the desired complex information which is either included within the first image information or synthesized therefrom.

In an automated production system, and "engine" is provided that follows a set of rules or a model. Interactive input from the user may also be used to control the presentation, so with each production, the results will be at least slightly different.

According to a further object of the invention, a customer is provided with the ability to place an order on-line, and, for example, preview a photo/audio/text-personalized product online before ordering. Further, the personalized product may be published digitally and delivered in linear or non-linear (interactive) form for user consumption on a personal computer, integrated computing and media presentation platform (PC/TV), gaming console or set top box.

A consumer can provide consumer specific data (digital images, characteristics, names, address, etc.) that is automatically merged with a selected content template of a convenient form of algorithmic/video/audio/printed data, then output via various output devices to assorted media including analog or digital video, digital video disk (DVD), digital online video (both linear and non-linear), interactive games, compact discs, digital audio, photo and/or text-personalized printed matter (books, posters, calendars, stickers, transferable substrates) that are each personalized by virtue of the inclusion of some combination of the data (images, audio, text) that has been provided by the consumer. The previewing features allow the customer to, in many cases, assemble and view/hear the personalized product online before ordering, thereby improving the quality of the purchasing experience. See, U.S. Pat. No. 5,963,214 (Cok, et al.) Oct. 5, 1999.

Advantageously, the same personalization data set may be employed for multiple customization or personalization sessions. Thus, while establishing a suitable library or database may require some efforts, this burden may be distributed over a large set of customized content presentations.

The SMIL language may be used for Internet-based (or even local) presentations to synchronize and choreograph presentation of the various data elements. Typically, in using SMIL to script a presentation, the user is provided with a high level set of tools which provide set appropriate functions for the presentation and insulate the user from the low-level programming language. SMIL may also be used to integrate locally stored and web-hosted content into a single presentation.

Likewise, various operating systems may be employed, for example Microsoft Windows® CE, as a basic platform. In the case of real-time presentations, hardware graphics acceleration is generally required, although as general purpose central processing units (CPU) gross in power, and depending on the quality of the desired presentation, such hardware graphics acceleration may be optional. These hardware graphics accelerators tend to operate by drawing polygons into a display buffer. The vertices of the polygon are defined based on, for example, a set of mathematical models and applied physical laws by the CPU. These polygon models are often three dimensional, projected onto a two dimensional space. The faces of the polygon are rendered based on a set of characteristics, as well as lighting, shading, reflections, etc., with respect to the exposed faces. The polygons may also be texture mapped with an arbitrary surface image.

According to the present invention, objects presented to the user may also include hyperlinks to facilitate interactive use of the presentation. These hyperlinks therefore allow the user to select a particular object or aspect of an object, which is then transmitted to a server. The server then interprets the hyperlink message, which may result in a change in flow of a presentation, a call to a different object or set of objects, or other program parameter. The hyperlink may be present in the foreground object, a background object, or even a peripheral object.

It is noted that, in producing complex personalized multimedia presentations for Internet delivery, advertiser subsidies may be useful. In theory, the advertiser may select aspects of the presentation from which to present commercial messages, and possibly to attract the user's attention. The user may then gain further information from the advertiser by selecting an explicit, implicit or hidden hyperlink to an advertiser-specific message (e.g., an advertiser web site) or modified presentation (e.g., including objects from the commercial sponsor). These commercial messages may also be presented during latencies due to serving a request and/or downloading of data, and -thus may be acceptably obtrusive without being particularly intrusive. In other instances, the commercial sponsor may fully integrate its message into the presentation. See, U.S. Pat. No. 5,903,317 (Sharir. et at.) May 11, 1999.

The present invention therefore encompasses the application of variable consumer data to a standardized template that includes images, audio, and text. The consumer may be a silhouette of ahead, or an entire human image, or any portion thereof. The image may, for example, be assigned to a prescribed position based on predetermined coordinates (for each frame). This technique may be used, for example, for making themed presentations (e.g., a photo-themed Barney or Disney "story") and for interactive or linear photo albums or customized presentations. See, U.S. Pat. No. 5,830,065 (Sitrick) Nov. 3, 1998.

The consumer may create the album through an Internet website, selecting which photos to use, photo sequence, the size of the photos, the pacing of the presentation, the musical accompaniment, the background wallpaper. The consumer may then view the presentation online, or e-mail the presentation, or an invitation, e.g., by transmitting a Universal Resource Locator ("URL") to view the presentation to friends and family who can then view the presentation either linearly or interactively. A bound or unbound hard-copy of the images, or a video copy of the presentation may also be provided.

The photo album, or slideshow, will allow a consumer to indicate which photos from their online archives they want to feature in an online presentation. The consumer then selects, for example: the order in which selected images appear on-screen; how long selected images appear onscreen; whether or not to include narration with the images; what narration accompanies each image; whether or not music accompanies the images (and what type of music); what background do the images appear against; what effects are to be used in transitions from one image to next; what portion of each image appears (irregularly sized images may have to be scaled or cropped to accommodate template); and what sound effects accompany each image.

Embodiments of the invention allows the user to interact with the presentation. In this case, the consumer can change the order of events, or interact with the content in any way, viewing portions of a presentation in flexible order. The presentation therefore need not be delivered on a sequential access medium, such as videotape, and may instead be delivered via digital video distribution medium. In a preferred embodiment, a customized presentation is delivered in digital form to a multimedia platform having random access capability, allowing for non-linear interactivity. In an interactive format, the order in which various personalized segments occurs will be variable, depending on how the subject interacts. For example, if Barney asks a child what two plus two equals, and the child selects "five". Barney will say, "Steve, that's not correct. Two plus two equals four." Had the child answered correctly. Barney would have said "Steve, that's right. "Two plus two does equal four!". In this case, sets of segments are provided, along with linkage rules for appropriate presentation. Therefore, the invention contemplates the use of an intelligent presentation system to analyze the rules in real rime to splice and/or synthesize the desired presentation. The presentation system may be, for example, a home "web" server. Advantageously, the presentation system may merge the template, user variable data and rules at run-time, allowing the template itself to be multicast, thereby efficiently using bandwidth. In an optional embodiment, the template may be broadcast as a video transmission and stored in the home web server mass storage system. The user variable data man be downloaded from a remote web site or generated locally. The rules for presentation and merging of user variable data are downloaded digitally from a remote web site, assuring the possibility of accounting for the use of the transmission by the content owner. The template may also be encrypted or scrambled, requiring a key for decoding.

Micropayment System

Advantageously, where objects employed commercially are available from publicly accessible sources, a micropayment scheme is implemented to allow commercial users to obtain rights and clearance for commercial use of the objects, without hindering non-commercial use thereof. Thus, in contrast to known micropayment schemes, the present invention may provide an "optional" compliance system. The following U.S. patents define aspects of micropayment and on-line payment systems: U.S. Pat. Nos. 5,930,777; 5,857,023; 5,815,657; 5,793,868; 5,717,757; 5,666,416; 5,677,955; 5,839,119; 5,915,093; 5,937,394; 5,933,498; and 5,903,880. See also, Rivest and Shamir, "PayWord and MicroMint: Two Simple Micropayment Schemes" (May 7, 1996). Micro PAYMENT transfer Protocol (MPTP) Version 0.1 (22 Nov. 1995) et seq. Common Markup for web Micropayment Systems, Micropayment-Markup (9 Jun. 1999).

While the compliance may be volitional on the part of the user, an automated system may be provided to automate compliance and accounting. Thus, for example, a watermark or associated code may be provided with each object. As an object is prepared for use, it maybe analyzed for the presence of the watermark or associated code to indicate a claim of proprietary rights and information for clearing commercial use. The system may automatically trigger, or manually trigger, a monetary transaction to compensate the proprietary rights holder. Advantageously, a "receipt" or electronic return code is provided to indicate the acquiescence of the rights holder to the use, which may also be automatic or manually triggered. This may take the form, for example, of a simple electronic or mailed message, an encrypted code (preferably a public key/private key encrypted message) or a watermark (or alteration of watermark) on the object, which will be retained through most common types of processing.

Therefore, it is seen that a service bureau may protect the rights of third parties in proprietary objects while facilitating their legitimate use. The micropayment system may also be integrated with more traditional types of secure micropayment systems, such as the MPTP, PayWord, MicroMint or Millicent.

Optionally, the present invention may provide for automated negotiation and accounting for license fees, so that the available licensed content (and, for example pricing model) need not be predetermined for the system, but rather, the available content and cost determined at the time of transaction. While this generally requires that the content provider anticipate demand and pricing, the availability of this information with the object will facilitate its use and appropriate compensation. Further, this same mechanism allows a content owner to program a clear prohibition against use, which may take the form of a binary flag or unreasonable pricing.

The present invention therefore provides, as an aspect thereof, a system which accesses a work, for example through the Internet, in a private database, or as a physical copy, determines whether the work is compliant with the accounting system through associated data, accounts to a proprietor of the work for a value thereof and to receive an implied authorization, and makes a copy thereof. Noncompliant works are not copied. The system provides that, associated with the work is a set of rules defining an accounting value, and therefore allowing a determination of a cost. Optionally, after accounting and implied authorization, a different version of the work may be accessed or copied, or otherwise inaccessible content made available. Therefore, a user may be provided with sufficient information about or of the work in order to make a decision, without impairing the commercial value of the work.

The present invention therefore provides an automated rights clearance system. It is noted that, in many cases, the accounting for the use of the work will entail voluntary or reasonably voluntary compliance, however, in many instances, the impediment to appropriate accounting is not an unwillingness to account, but rather the transaction costs to determine a need for accounting and obtain appropriate clearance. This scheme also provides relatively unimpeded use of the work under implied license circumstances. Thus, a work owner need not make a predetermined decision of whether the work will be freely available or available only upon payment of a fee; rather, the intended use will determine the rights clearance.

Accordingly, each work complying with the system has associated therewith an identifier, which may include or reference to information which denominates at least an owner thereof, and optionally the identity of the work or copy thereof, the value thereof, terms of use, and the like. This associated information may be provided as a metatag or text message within the work, as an automated reference stored in conjunction with the work, as a watermark or digital watermark embedded in the work, or as a hyperlink associated with access to the work.

The associated information may be manually or automatically analyzed and complied with on an volitional or automatic basis. For example, for works available on or through the Internet, an Internet browser or "plug-in" may be provided which automatically reads and analyzes the associated information. After analysis, the browser may automatically trigger or allow the user to manually trigger an accounting transaction, wherein an identifier (e.g., credit account number, micropayment script, etc.) of the user seeking authorization or clearance is conveyed to an accounting system, which debits the user's account and credits the owners account appropriately. The accounting system need not perform symmetric transactions for the user and owner, and for example, may take a commission for use of the system, or apply a set of rules. Thus, for example, the user may pay a set amount for each use, while the accounting system may pay a variable amount for use, depending on the past history of use or transactions with the owner, blanket agreements encompassing a variety of works, and minimum transaction fees or aggregate fees. The work may, in the case of the Internet, be any kind of digitally transmitted data file, and may also encompass sales, service or promotional accounting as well in the manner of a known micropayment transaction system. In other types of networks, the object may be any supported data type.

Each content owner is enrolled, and agrees that works listed in a complying format will be available in accordance with a set of rules which are implemented by the system. The authorization to the user may take the form of a receipt transaction generated for the account of the user, an e-mail authorization, token, or other communication or assent.

It is noted that, in the case of serial copying, the associated information will preferably remain with the work, so that each separately accountable use provides compensation to the work owner. A rights management database may also read the associated information to determine the nature of the rights, and possibly to implement enforcement. Thus, copies of an object may be subject to different rules and tracking. In order to ensure continued association of the work and associated information, the information is preferably provided as a digital watermark or required datum for normal decoding (e.g. a decryption key).

The present system relieves the content owner of the substantial burden of making licenses available and individual negotiations therefore. While mandatory accounting methods and encrypted content are known alternatives, this does not generally permit a "try before you buy" scheme nor to distinguish between consumer and voluntary compliance by commercial enterprises. Further, the present technique minimizes the transaction costs, increasing the probability of voluntary compliance. The present technique is also generally compatible with known types of open Internet browsing techniques, and therefore, at least in some embodiments, does not require customized hardware or software. In other instances, customized software may be employed to simplify the assent process.

In contrast to prior systems, aspects of the present method rely on the desire of the user to appropriately compensate the content owner, as long as the transaction costs are appropriately scaled to the values of the rights. Prior systems have transaction costs for content licensing which are of the same of higher order than the value of the rights to the content owner, and/or are closed systems.

The types of content may include images, video, multimedia clips, music, text content, Templates, software and applets, and an other sort of information.

In fact, it is not necessary that the system be based on the Internet. For example, a digital watermark in a printed image or musical work may include the necessary associated information. Upon electronically scanning or recording the work and subsequent analysis, the associated information may be extracted and used to generate accounting information. This accounting information may be manually or automatically employed to compensate the content owner for the use or recording.

It is preferred that the associated information be present in a standardized form for each media Type, so that the search and analysis time is minimized.

Accounting System

The present invention provides an integrated accounting system for accounting for the images. This accounting may encompass the rights clearance discussed above, but is principally for accounting for an underlying transaction between a purchaser and provider. In a preferred embodiment, a user employs a service for manipulating graphic and/or multimedia information, resulting in an electronically defined product, which may be delivered in tangible or intangible form. In the case of an intangible delivery, the accounting system controls for example, delivery and storage options, payment method, third party rights accounting, and the like. In the case of delivery of a tangible object, the accounting system also preferably integrates an inventory management, shipping/receiving, rights management and optionally tracking of user owner merchandise.

The present invention provides a system and method for producing a customized image and/or multimedia work, including financial accounting therefor. In general, the product includes an automatically generated or predetermined background image or sequence, which is merged with a custom or variable image, e.g., a foreground image. This system and process integrates an accounting system, wherein an account, for example a charge account of a recipient or authorizer of a customized work, is charged for the production. In many instances, a further account is credited for a portion of the accounting proceeds (or an independently determined amount) based on a referral, a license fee or the like. Thus, a single integrated system manages both production and rights management for the customized works. It is noted that, if proprietary content is employed, a plurality of rights-holders may be due compensation. Therefore, the present invention optionally accounts for compensation of such rights holders in accordance with an amount due. The license fees may be due, for example, based on a per unit fee, a fee per accounting period, or other fee arrangement.

An important element of a preferred accounting system according to the present invention is an integration with the handling of physical goods, especially where allocated to a particular customer. Thus, as soon as a resource is committed to a particular customer, that resource must be tracked for proper handling and delivery. This resource commitment is preferably linked to an integrated with the accounting system, in order to avoid duplicative processing and to provide quality services. In this case, the accounting system serves both financial and production purposes. Obviously, a commercial enterprise needs to assure proper billing and cash flow. This assurance is accomplished by charging customers for product, and handling various acceptable forms of payment. Such payments may include cash (not preferred), checks, credit cards, money orders, electronic funds transfers, on-line monetary payment systems and the like. It is preferred to ensure that billing for goods or services is coordinated with production and shipping. Thus, the accounting system allows such coordination.

On Line Framing Service

An automated framing system receiving on-line orders is also provided. In this case, the invention encompasses a factory which generally operates in a piece-on-demand fashion, although common styles may be inventoried. In this case, an order is defined interactively preferably on-line. For example, a user may wish a particular image to be processed, printed, matted and framed. The user must first define the image itself, including cropping and reproduction size. Various image reproduction options may also be present. Further, in the case of images subject to third party rights, a rights management and rights clearance scheme may be implemented. The user may then define a matting and cover glass (or plastic) option. The user may further define the frame and hanging options. At each step, a preferred embodiment of the invention provides feedback to the user of how the framed picture will look. This may be either by downloading a dynamic image update with each selection made by the user, or by providing updates of portions of the image as they are selected or updated. Image portions may be stored locally on a client system or transmitted from a server.

After the framing order is entered, including payment and shipping options, the order is processed. This processing includes printing the image in the desired format, cutting the mat, providing the appropriate cover sheet (which may be precut or cut to order), and making the frame. Typically, frames are formed from a molding which is cut into two pairs of sides with 45 degree beveled ends, which are then joined into a rectangle or square. Typically, the number of molding options will exceed the number of machines available for cutting, so the moldings are loaded into the machines on an as-needed basis. In other cases, a post-processing step applied a special coating or finish to the molding. In any case, it is generally efficient to aggregate like types of moldings and/or finishes to be processed together. Therefore, the order dispatch system groups orders in a manner which reduces idle time or inefficiency, without unduly increasing processing latency. Therefore, the manual steps in order processing are minimized.

Two general options are available to provide rapid turnaround. First, all substantial components of the order are prepared simultaneously, and then matched in a final assembly step, which may be automatic or manual. Alternately, a critical element, such as the frame, is first created and coded, for example with a bar or other optically readable code. In subsequent stages of processing, the optical code is read and the associated component at that processing stage selected or integrated. For example, in a last processing step, the image selected by the user is printed and mounted in the frame, and the framed picture shipped to the user. According to tile first method, careful management is required to assure that all elements of an order are available simultaneously and at the same location for integration and assembly: slowdown of any component may lead to partial inventory buildup, and the issues of management of component may be complex. On the other hand, the later method lends itself to manually assisted production and eases the difficulty of matching components of an order.

The present invention also allows for physical framing of images, instead of merely electronic merging of surrounding data. In this case, the consumer is permitted to select from a wide selection of frames, for example by specifying a price range, which will result in presentation of frames in that range; scroll through samples of each available style of frame, seeing each frame around the photo in question; select a matte for the photograph: rotate the selected combination of photo/matte/frame in 3 dimensions; order completed design online, specifying shipping method; invite friends to view framed photo online; select from additional options such as "create postcards from this photo", "order poster", "order mousepad", etc.

These objects, as well as further objects which will become apparent from the discussion that follows. For a full understanding of the present invention, reference should now be made to the following detailed description of the preferred embodiments of the invention as illustrated in the accompanying drawings.

BRIEF DESCRIPTION OF THE DRAWINGS

The preferred embodiment of the invention will be shown by way of drawings of the Figures, in which:

FIGS. 5a and 5b depict image frames in which the head of a human subject has been enlarged and reduced in scale, respectively;

FIG. 6 depicts an image frame containing the body of a human subject, without a head;

FIG. 7 depicts an image frame in which the head of a human subject has been superimposed upon the body shown in FIG. 6;

FIG. 10 is a flow chart of a computer program for implementing the media producing process in the apparatus of FIG. 3;

FIG. 11 is a graphical flow chart depicting the transformations according to the present invention;

DESCRIPTION OF THE PREFERRED EMBODIMENTS

Figure 1:
FIG. 1 is a diagram showing one frame of an image in which a boy's head is superimposed upon a hand-drawn boy's body.

The preferred embodiments of the present invention will now be described with reference to FIGS. 1-19. Identical elements in the various figures are designated with the same reference numerals.

EXAMPLE 1

FIG. 1 illustrates a typical electronically displayed image frame wherein the head 10 of a male child is superimposed upon a hand-drawn body 12. As may be seen, the head and body are in the proper relative proportions and the head is disposed upon the body at the proper location. This is the type of composite image which is automatically produced by the method and apparatus according to the present invention.

Figure 2:
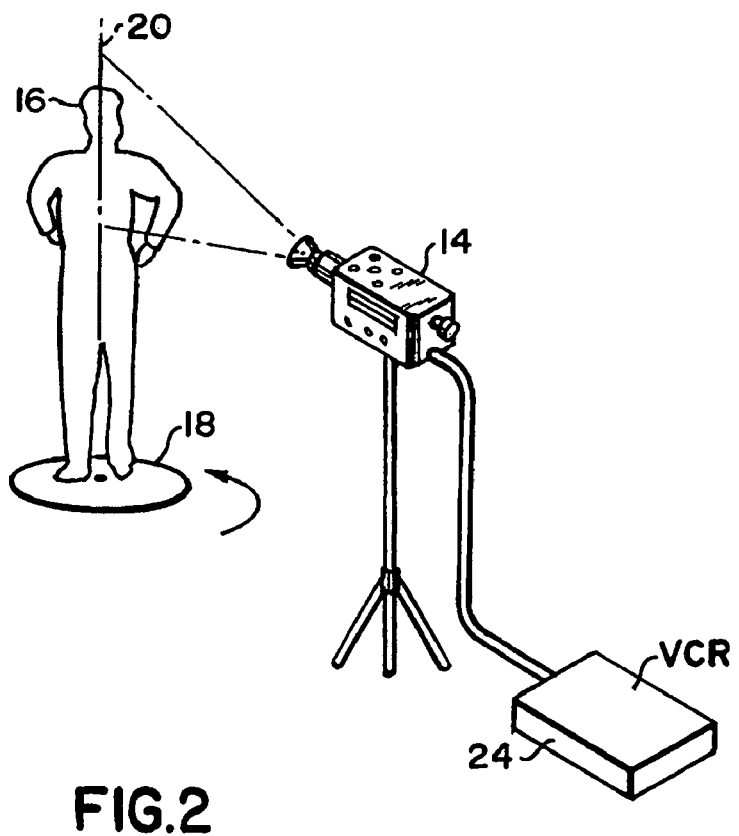
FIG. 2 is a perspective views showing how the head of a human subject, in various angular positions, is electronically scanned to produce a plurality of electronic images.

FIG. 2 illustrates how the head of a human subject can be scanned by an electronic scanner to form stored images. In this case, a video camera 14 is arranged to view the head 16 of the human subject. This human subject stands on a platform 18 which is rotated about a vertical axis 20. In this way, a plurality of video flames are obtained, each containing the image of the head 16 in a different angular position. These video frames are stored on a video cassette recorder (VCR) 24. The stored video frames may be thereafter digitized, in an analog-to-digital converter, to provide digital representations of each frame.

Alternatively, the video frames containing the image of a human head can be obtained via a photograph of the human subject. For example, a Hewlett-Packard Scanjet (r), scanner may be employed to electronically scan a photograph and produce digital representations defining an image frame. Perspective views of the subject may be artificially generated from one or more views of the subject, by processing the electronically stored image based on a model of a human subject's head.

In order to provide special effects, the stored image may be "morphed" with another image for display. The process of "morphing" involves creating a series of morphologically defined interpolations between two corresponding images, with preservation of fluid continuity between corresponding features, i.e., edges, eyes, nose, mouth, neck, hair, etc. This allows, for example, a transition from a human head to an animal head. Alternatively, the stored image may be "tweened" with another image, forming an interpolation of the two images, which allows a more natural attachment and posture of a human head on an animal or other type body, and assists in animating the human head according to a predetermined choreography. In general, morphing or "tweening" will be performed in a batch processing mode prior to final production, although this is not required.

FIG. 16 shows two extreme images, and a series of interpolations between the two extremes. Each of the interpolations is a "tweened" frame, while the series of interpolations is a "morphed" sequence. In general, for presentation, a "tweened" frame is more carefully prepared from closely corresponding images, and all significant features remain defined, as these will be distinctly visible for a period of time. On the other hand, when presented as a series of frames, certain features in a "morphed" image may become momentarily indistinct during the transition, especially during dramatic transformations, as shown in FIG. 17.

In the preferred embodiment according to the present invention, the first anatomical portion of a subject is a head and the second anatomical portion is a body, preferably derived from different sources, e.g., the head portion is from a different entity than the body portion. The first image information is obtained either through a video or electronic camera from scanning one or more still pictures. Alternatively, an artist may produce a drawing or caricature of the head and/or body portions, either directly with an electronic capture system or using standard artistic media which is later input into the computer system by scanning or other imaging process. The second image comprises an animated sequence, a videotape, a series of still scenes, or computer generated background scenes. The second image preferably has an anatomical adjoining part which allows normal appearing placement of the anatomical part of the first image, or includes a buffer zone which obscures misalignment or other visual artifacts from the merging process. Alternatively, the second image includes only the second anatomical portion, e.g., body, which is electronically joined with the first anatomical portion, e.g. head, and the joined first and second images are together superimposed on a background.

Figure 3:
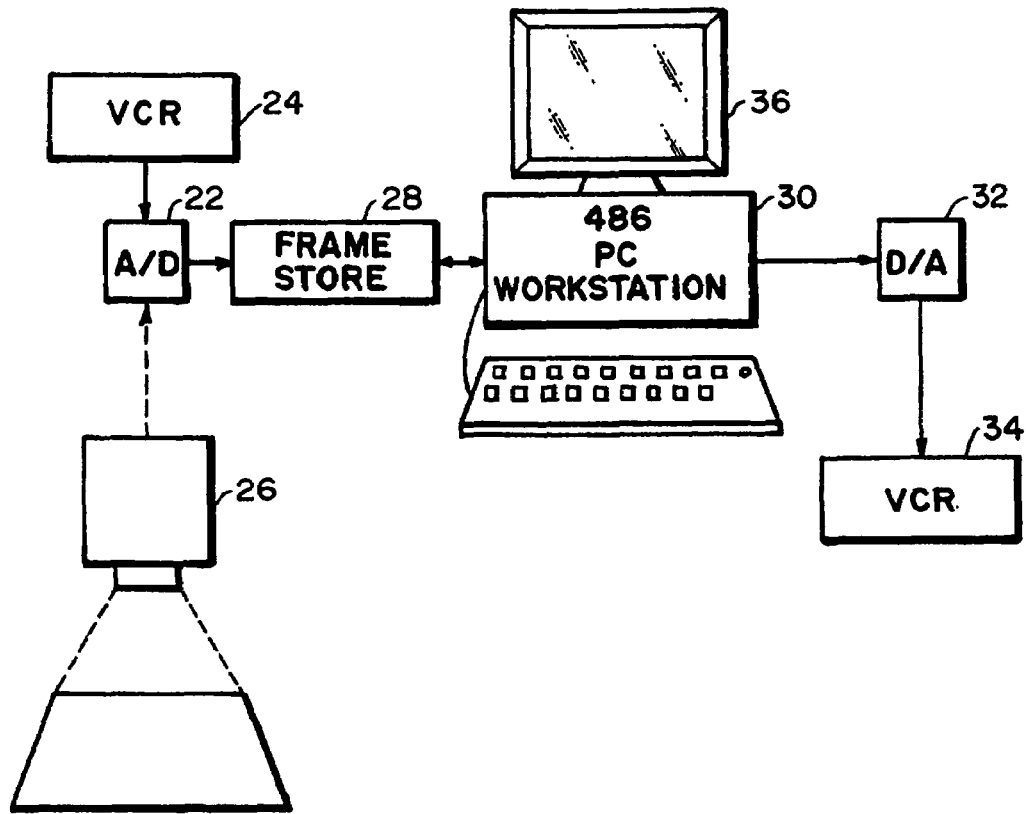
FIG. 3 is a block diagram of an electronic system employed, according to the present invention, to produce electronic images of the type shown in FIG. 1.

FIG. 3 illustrates a first apparatus employed for implementing the image-making method according to the invention. As is shown there, the system comprises all analog-to-digital converter 22 which can receive video image frames from the video cassette recorder 24 or digitizes images in a flat bed scanner 26. The flat bed scanner 26, which may, for example, he a Hewlett Packard Scan Jet(r), or Sony flat bed scanner, electronically scans an image, e.g., 8½ by 11 inch hand drawn art work or an 8 by 10 inch photograph.

The digital representations of each image frame are supplied to a digital image frame store 28 which, in turn, is addressable by an IBM compatible 80486DX2/66 personal computer (PC) workstation 30. Of course, Intel Pentium(r), Apple Power PC, or other processors are known which may be employed for image processing. The frame store is preferably an IBM rewritable optical disk, although a magnetic disk. RAM or other type of memory may be used to store the image frames. The PC workstation 30 is provided with a video adapter, such as is available from Targa Systems, Inc. of East Berlin, Conn., USA, under model name "True Vision Targa Plus 64 Board", for displaying television images on the workstation CRT screen 36 from digital representations of such images.

The image frames composed by the PC workstation 30 are supplied in digital form to a digital to-analog converter 32 which, in turn, passes the analog signal to a YCR 34 or other video recording device.

The PC workstation 30 operates with two applications programs namely. AVS 4000 and AVS 5000, which are also available from Targa Systems, Inc. These programs, which may be used to implement the method according to the present invention for automatically superimposing the head of a human subject on a body contained in an image frame, will now be described in detail.

Figure 4A:
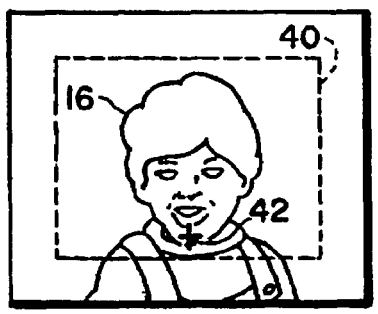
FIGS. 4a and 4b are image frames containing the head of a human subject in front and side views, respectively, as may be obtained with the apparatus of FIG. 2.
Figure 4B:
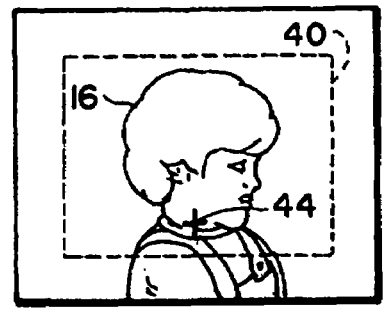

As shown in FIGS. 4a and 4b, the image of a human head is initially electronically scanned and then digitized, and a set of first digital representations defining a first image frame are stored in the frame store 28. The operator of the PC workstation 30 next displays the image of the head 16 on the workstation CRT screen 36 and selects a suitable frame size 40 for the image. In addition. the workstation operator selects a reference point on the first image frame 40 which indicates the location of the head with respect to the frame. This reference point is preferably a central point at the bottom of the chin, in the case of a full-face view, and a central point at the top of the neck in the case of a side view. These reference points are shown as points 42 and 44, respectively, in FIGS. 4a and 4b.

As a next step, the workstation operator causes the workstation to scale the image of the head, and produce and store digital representations of the head in a plurality of sizes, as shown in FIGS. 5a and 5b. Digital representations associated with each stored frame also define (1) the location of the reference point 42, indicating the location of the head on this frame, and (2) the size of the head in this first frame.

Previously scanned, e.g. by the flatbed scanner 26, and entered into the frame store 28, are digital representations of a picture containing the body of the human subject. The image frame containing this body is also displayed on the CRT display by the operator of the PC workstation. By observing the image, the operator produces a set of digital representations associated with this image frame defining (1) a reference point 46 on the frame 44 specifying the desired location of the head on this frame, (2) the desired size of the head on this frame 44.

Thereafter, the operator superimposes the image frame 40 containing the human head 16 in the desired size upon the image frame 44 with the reference point 42 superimposed upon the reference point 46.

Finally, the superimposed images, so generated, are supplied to a digital-to-analog converter which converts the image to a single frame in NTSC format which is then recorded on a VCR 34.

Figure 8:
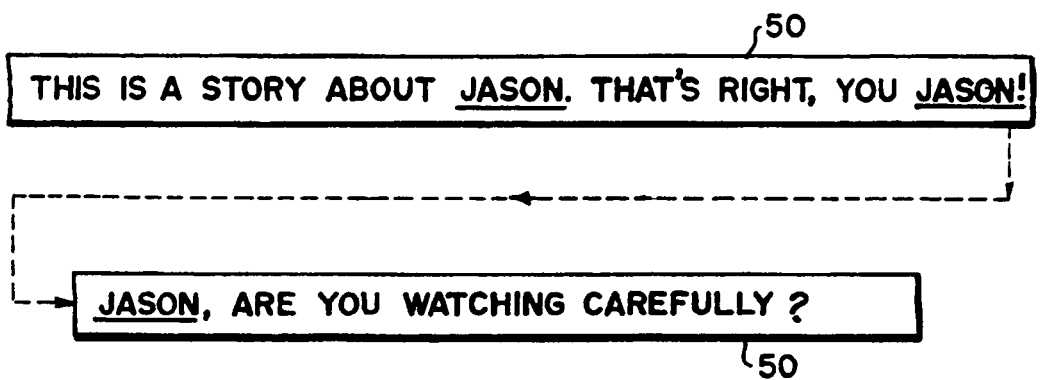
FIG. 8 is a representative diagram of a voice recording showing how the name of a person is inserted into a line of text.
Figure 9:
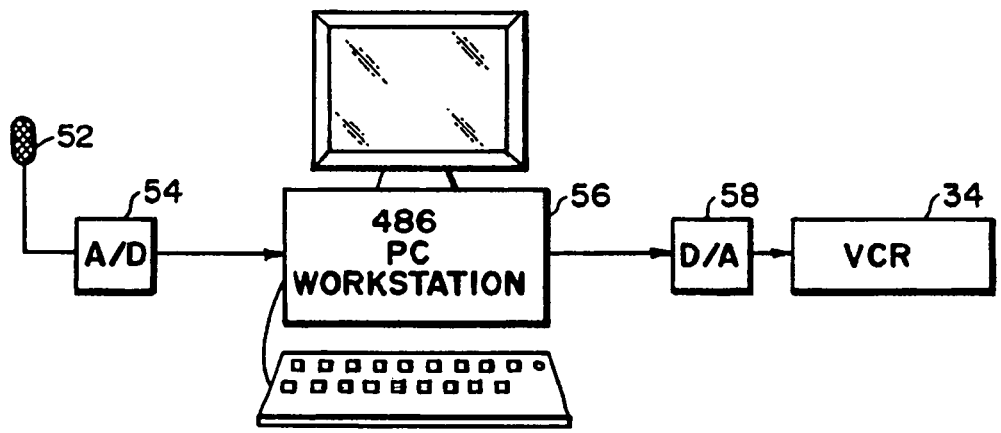
FIG. 9 is a block diagram of the an electronic system, according to the invention, for inserting the name of a person in a voice recording.
Figure 12A:
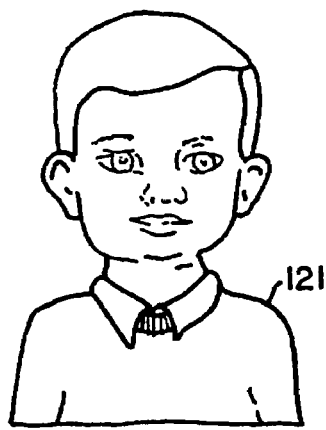
FIG. 12 depicts images used in an image merger.
Figure 12B:
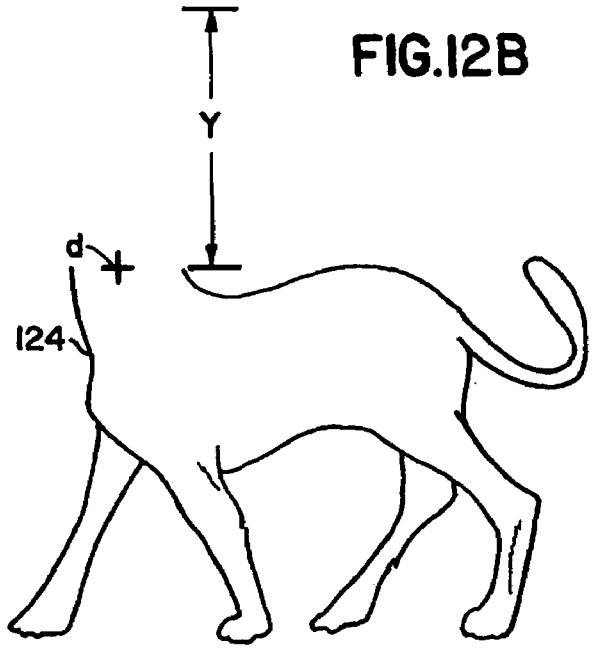
Figure 12C:
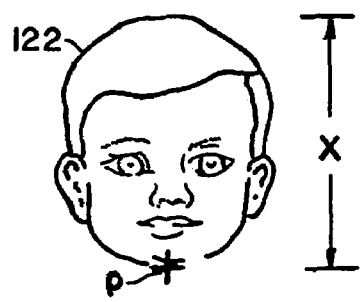
Figure 12D:
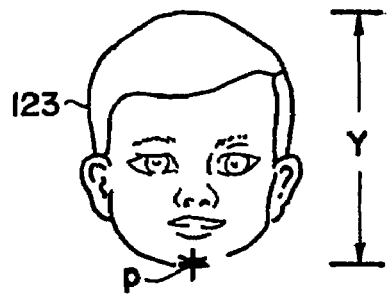
Figure 12E:
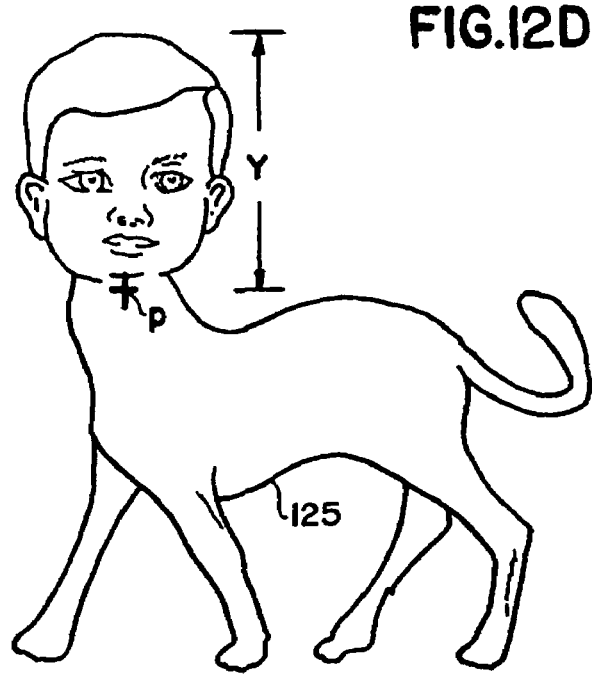
Figure 13A:
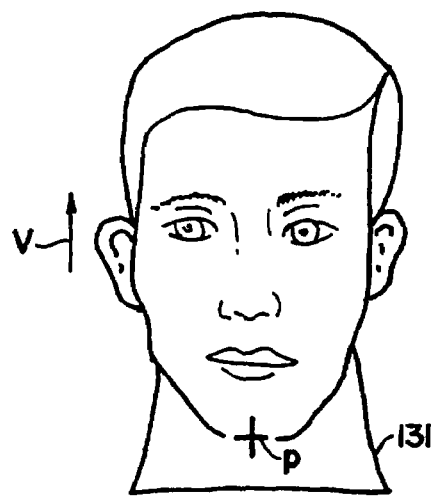
FIG. 13 depicts images having differing positioning.
Figure 13B:
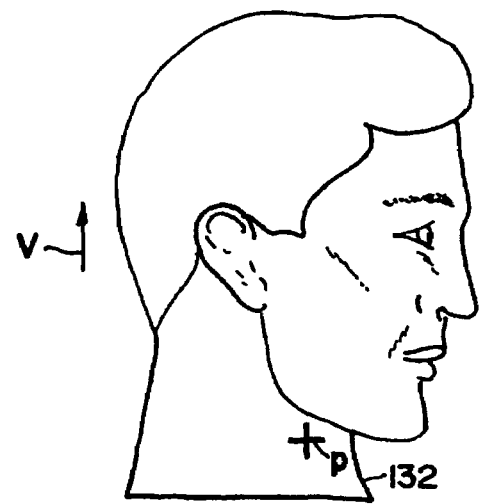
Figure 13C:
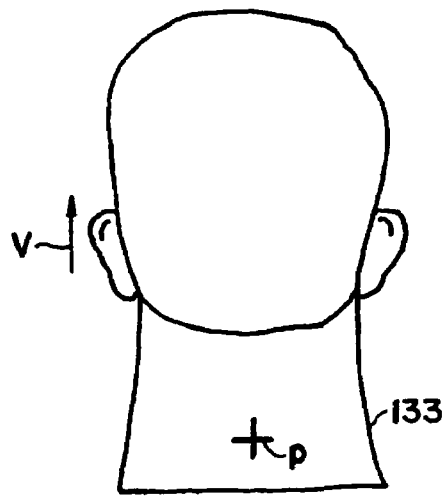
Figure 13D:
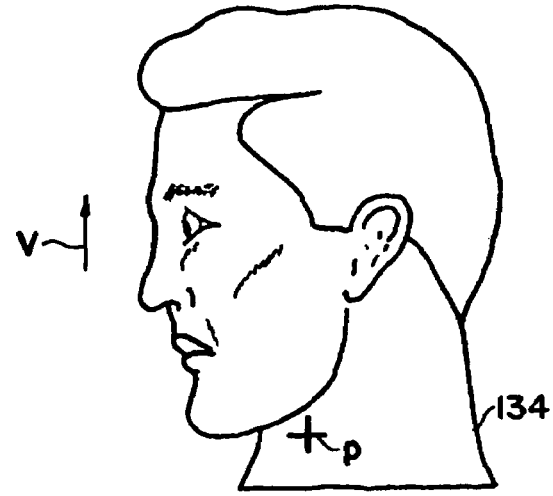
Figure 13E:
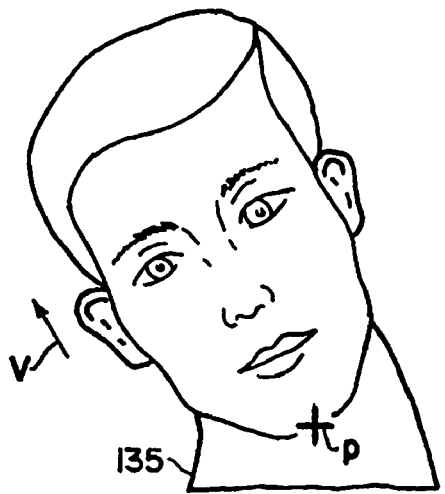
Figure 13F:
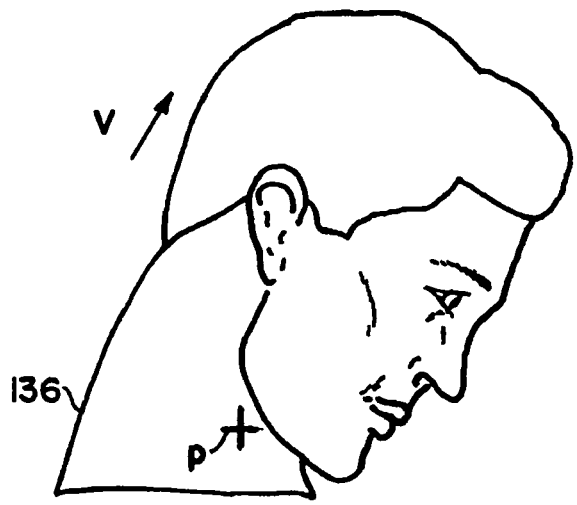
Figure 13G:
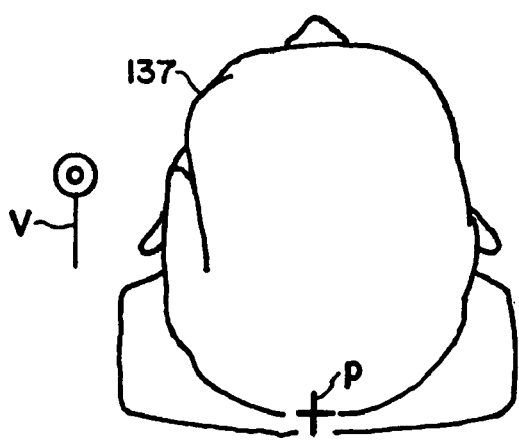
Figure 13H:
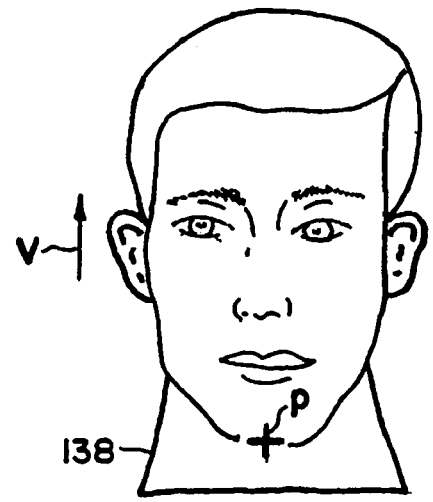
Figure 14:
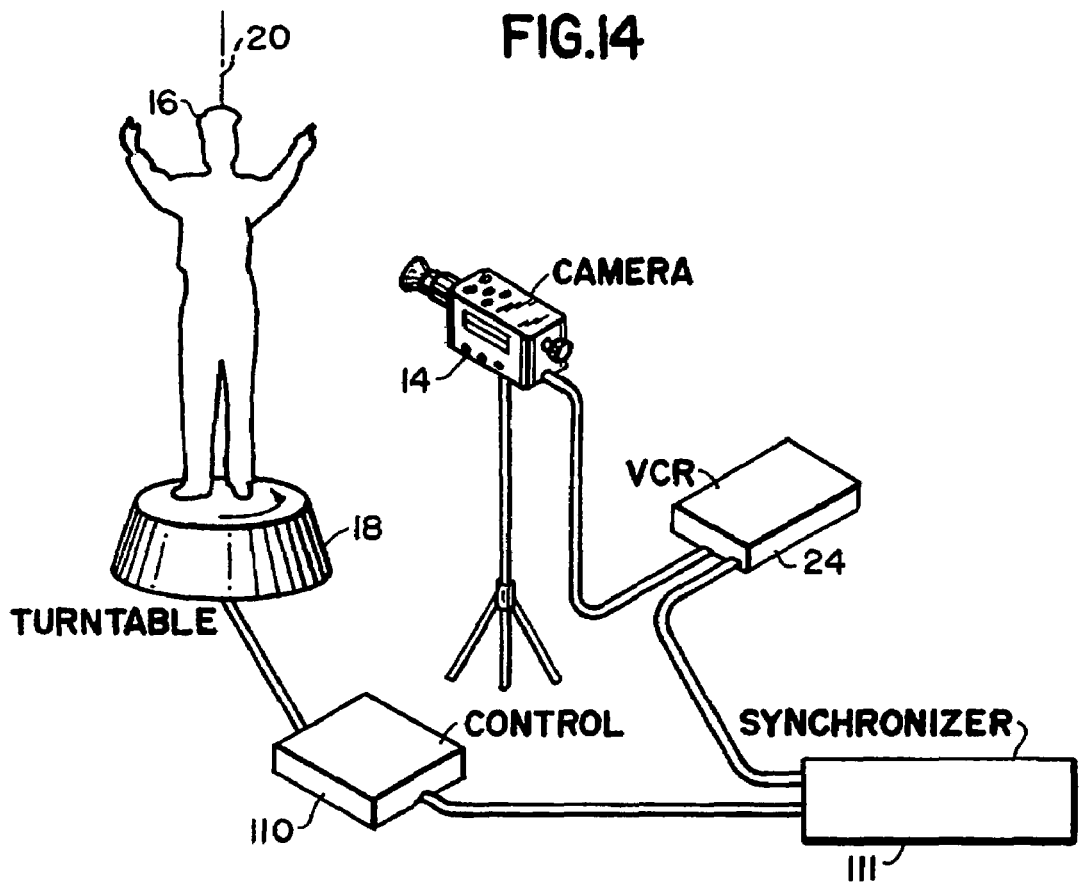
FIG. 14 is a semi-schematic view of an apparatus for obtaining customization information.
Figure 15:
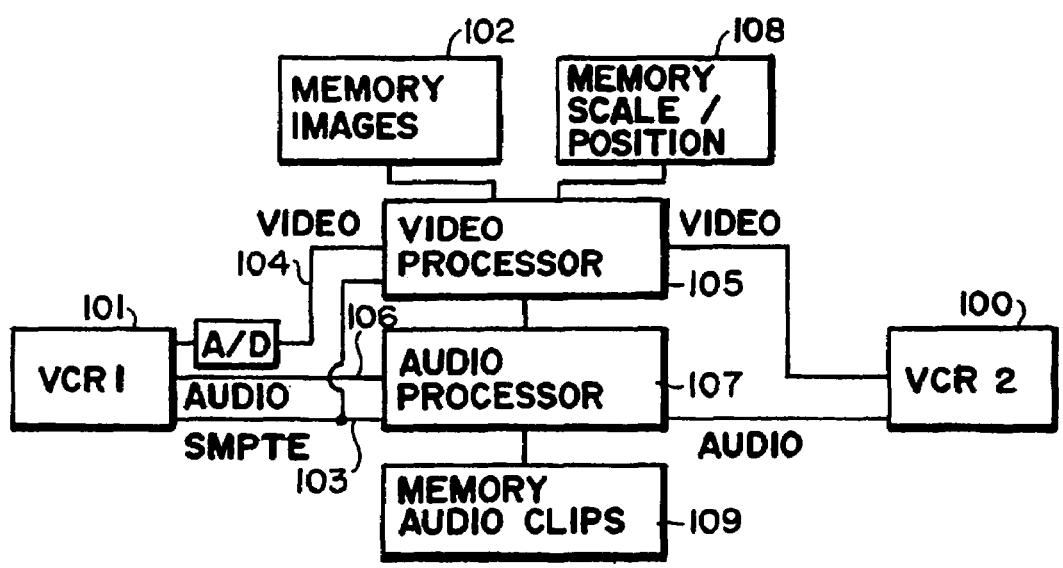
FIG. 15 is a block diagram of an embodiment according to the present invention.
Figure 16A:
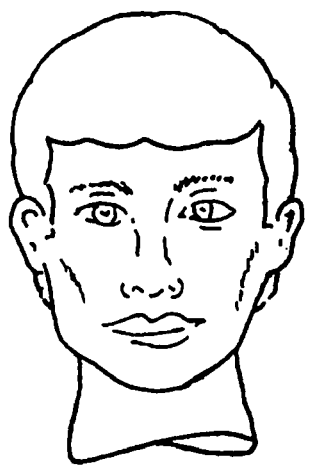
FIG. 16 depicts two images with "tweened" frames, which if presented dynamically, provide a "morphed" image.
Figure 16B:
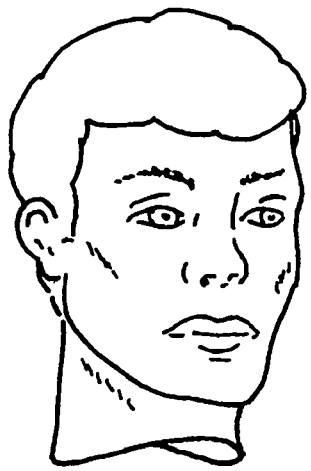
Figure 16C:
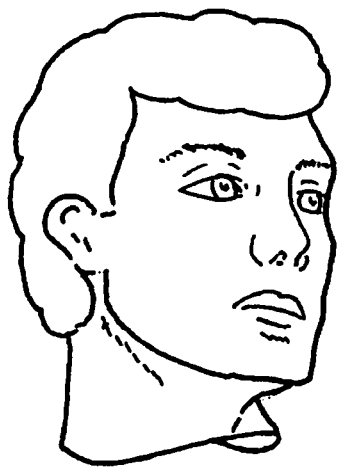
Figure 16D:
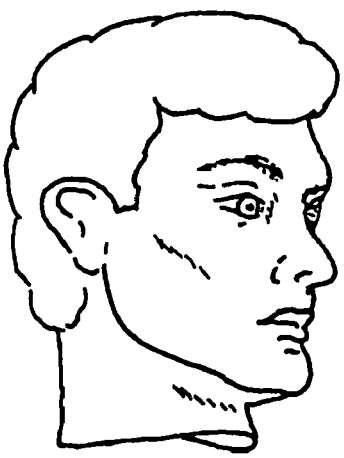
Figure 16E:
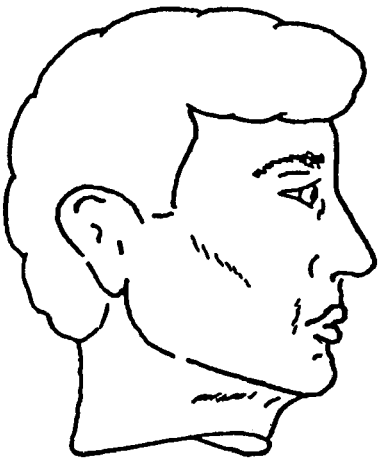
Figure 17A:
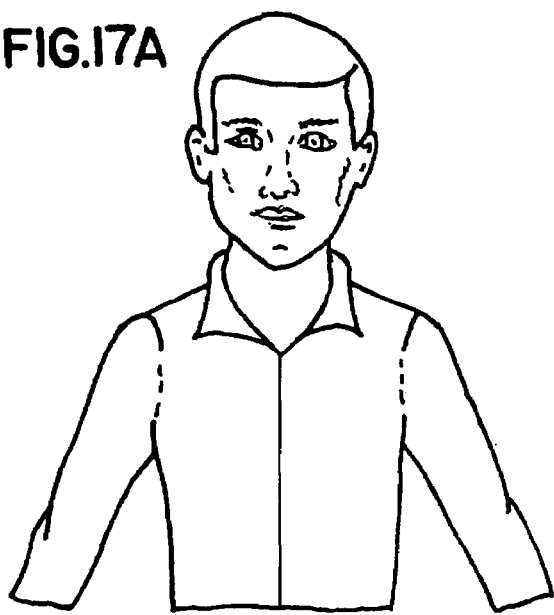
FIG. 17 depicts a starting and ending frame of a "morph" transition, with several interframes.
Figure 17B:
Figure 17C:
Figure 17D:

FIGS. 8 and 9 illustrate how a voice recording may be generated to provide a custom tailored soundtrack for a video recording. In this example, digital representations of the name of a human subject, "JASON", is inserted in a pre-recorded and digitized soundtrack.

FIG. 8 represents an excerpt from a magnetically recorded soundtrack DO. According to the present invention, the word "JASON" with the proper intonation, is inserted at the beginning and end of pre-recorded sentences.

FIG. 9 is a block diagram showing an apparatus for implementing the method. This system comprises a microphone 52, analog-to-digital converter 54, a PC computer workstation 56, a digital-to-analog converter 58 and the VCR 34. The PC workstation 56 contains all IBM audio, capture and playback adapter with associated software.

The method of producing the voice recording of FIG. 8, with the aid of the apparatus of FIG. 9, will now be described.

Initially, the text of the voice recording, without the inserted name, is spoken into the microphone 52. This text is recorded in digital form on the hard disk memory of the PC workstation. Thereafter, the name of a human subject, e.g., "JASON", is spoken into the microphone 52 with three different intonations: declaratory, exclamatory and interrogatory. These sounds are also digitized and stored on the workstation hard disk.

Preferably, an entire library of names is so recorded on the workstation hard disk for later use. Of course, different names may be synthesized by a computer system based on the pronunciation of the name and a voice synthesis algorithm. The audio sound track may also be processed on an Apple Macintosh computer with sound capability.

When a video cassette recording is made, the audio data is automatically supplied via the digital to-analog converter 58 to the VCR 34. Personal names, e.g., "JASON", with a proper intonation, are inserted in this audio data stream on the fly. If the name is to be added at the end of a sentence, digital representations thereof are added "flush left", i.e., with a variable length sound gap between the end of the sentence and the beginning of the next sentence; if it is to be inserted at the beginning of a sentence, the digital representations are added "flush right", i.e., with a variable length gap before the name, so that the sentence will sound "natural" in reproduction. The name may also be embedded in the sentence, with variable length gaps at pauses within or at the beginning and/or end of the sentence.

The present invention therefore encompasses a method including the steps of:

(a) electronically inputting a first image of at least a portion of said Subject and storing a set of first digital representations defining said first image in a foreground electronic image frame;

(b) generating a plurality of second images of a picture containing a remainder portion of said subject and storing a plurality of sets of second digital representations, each set defining one of said second images in a background electronic image frame:

(c) producing a set of third digital representations associated with said foreground frame defining (1) a first reference point on said foreground frame indicating the location of said subject portion in said foreground frame, and (2) the size of said subject portion in said foreground frame;

(d) producing a set of fourth digital representations associated with each of said background frames defining (1) a second reference point on each respective background frame specifying the desired position of said subject portion in said background frame, and (2) the desired size of said subject portion in each respective background frame;

(e) converting said set of first representations of said first image into a plurality of sets of fifth representations, in dependence upon the size information defined by said set of third representations and said plurality of sets of fourth representations, each set of said fifth representations defining said foreground frame with said subject portion scaled to said desired size and located at said desired position in a respective one of said background frames;

(f) combining said set of fifth representations defining said foreground frame upon said set of second representations defining said background frame such that said first and second reference points substantially coincide, to produce a plurality of sets of sixth digital representations, each defining a respective final electronic image frame containing said subject portion disposed upon said remainder of said subject at said desired position and with said desired size; and (g) storing said plurality of said sets of said sixth digital representations to provide a sequence of said final frames. Optionally, an accompanying sound sequence may be provided by;

(h) storing a sound sequence associated with said sequence of final frames: and (i) producing a video recording comprising said sequence of final flames and said associated sound sequence.

In accordance with a second embodiment of the present invention, a method and apparatus for carrying out a method, is provided which comprises the steps of:

(a) obtaining first image information relating to a first anatomical portion of a subject and producing a set of first representations of the first image;

(b) obtaining second image information relating to a second anatomical portion of a subject and producing a set of second representations of the second image defining a plurality of second image frames, the first anatomical portion being for placement adjacent the second anatomical portion;

(c) producing a set of third representations associated with the first image information defining (1) a first reference indicating a positioning of the first anatomical portion, and (2) a size of the first anatomical portion;

(d) determining a set of fourth representations associated with the plurality of second frames defining (1) a second reference on each of said second flames specifying the desired positioning for the first anatomical portion in said respective second frame, and (2) the desired size for the first anatomical portion in said respective second frame;

(e) converting the set of first representations of the first image into a set of fifth representations, in dependence upon the third and fourth representations, the fifth representations defining the first anatomical portion scaled to the desired size and with the desired positioning;

(f) merging the set of fifth representations with the set of second representations defining a respective second frame such that the first and second references substantially coincide, to produce a set of sixth representations defining a respective second image frame comprising the first anatomical portion disposed adjoining the second anatomical portion with the desired positioning and of the desired size; and (g) outputting the respective second image frame from the set of sixth representations.

Also provided is a method comprising the steps of:

(a) electronically scanning a first image of a head of said subject and producing a set of first digital representations of said first image defining a first electronic image frame;

(b) generating a plurality of second images containing a body for said subject and producing a set of second digital representations of said plurality of second images defining a plurality of second electronic image frames;

(c) producing a set of third digital representations associated with said first frame defining (1) a first reference point on said first frame indicating the given location of said head in said first frame, and (2) the size of said head in said first frame;

(d) producing a set of fourth digital representations associated with each of said plurality of second frames each respectively defining (1) a second reference point specifying a desired location of said head in said second frame, and (2) a desired size of said head in said second frame;

(e) converting said set of first representations of said first image into a set of fifth representations, in dependence upon the size information defined by said third and fourth representations, said fifth representations defining said first frame with head scaled to said desired size and located at said given position;

(f) merging said set of fifth representations defining said first frame with said set of second representations defining said plurality of second frames such that said first and second reference points substantially coincide, to produce a set of sixth digital representations defining a plurality of third image frames of a picture containing said head dynamically disposed upon each of said body portions of said second images at said desired location: and (g) outputting said plurality of third image frames from said set of sixth representations.

The setup of batch mode processing maybe quickly performed, allowing an operator to devote a limited amount of time to setting up a production and making any necessary decisions in a compressed amount of time. Thereafter, the production is automated, completing any batch mode processing and proceeding to real-time recording or presentation of the production. This automation permits efficient utilization of manpower and high output. For sake of example, a single operator can manage 48 or more simultaneous recording sessions. The image scanning and cropping, as well as the audio customization, or verification thereof, can be performed quickly by skilled operators, typically separate from the copying technician. Thus, if 10 minutes of time are required to set up processing of a single presentation (e.g., image customization, audio customization, copying attention, quality control and handling), then the productivity of a facility will be about 45 presentations (e.g., videotapes) per worker per workday. The recording latency, for example 18 minutes, is divided among a large number of copying sessions, reducing the effective cost per session. Obviously, if the work burden is reduced, for example to 6 minutes per presentation, then the worker productivity will correspondingly increase, e.g., to about 15 presentations per worker per day.

EXAMPLE 2

In general, an audio sequence will accompany the images, which will be a fixed sequence or a prototype sequence or template altered based on particular added information, such as a name, identification, or other contextual information. The audio sequence corresponds to the image sequence.

As illustrated in FIG. 10, the video and audio "personalization processes", respectively, according to the invention are carried out as follows:

Video Personalization:

First, a photograph of a child (any size) which includes a child's head—e.g. in full face view—is scanned using a color video scanner. That digitized image is saved using the Targa AVS 5000 software on a 486 PC workstation. (Block 60).

After being saved, the image of the child's head is digitally "cut-out" using a computer tablet and the tablet's pointing device. The cutting-out is accomplished by tracing the edge of the child's head with a light pink line. This shade of pink has the ability to blend the edges of the child's head with the background colors in other illustrations or scenes ("background images"). (Block 62).

It is also possible to automatically determine the edge of the object to the separated or extracted from the image. For example, a sharp difference in brightness or hue may be used to determine an edge location. Once a portion of the edge is identified, it may then be traced around a continuous region, even where the difference in brightness or hue is slight, and in the event that the color is identical, the vector of the edge may be interpolated or extrapolated from the edges previously determined.

The cut-out head is saved after pink pixels are added to the corners of the image ("foreground image"). These pixels are added because the heads are ultimately justified against the background images according to the bottom left-hand corner of the foreground image, and the pixels in the corner prevent differently oriented and sized heads from being automatically positioned incorrectly relative to the position of the illustrated body in the background image.

Next, using the PC workstation, the scanned-in head is automatically scaled to up to 30 different sizes, from small to large, each of which is saved as an individual foreground image with a distinct name (F1, F2, F3, etc.) to produce a file called "Faces". The head is in some cases also flipped (mirror imaged) and/or rotated. (Block 64). Of course, with sufficiently powerful computing hardware, these images may be scaled "on-the-fly".

As a next step, using the PC workstation, the proper foreground image (F1, F2, F3, etc.) is retrieved from the file "Faces" and superimposed automatically upon the next successive background image of a video story (ABC1, ABC2, ABC3, etc.) at its proper location. Thereafter, the combined image is stored on a hard disk or directly to a video storage device, such as a VCR.

The first name of the person shown in the Faces file is written out as text and this text is inserted in those background images (ABC1, ABC2, etc.) that include the child's name. (Block 66).

The presentation ("story") is now recorded from the hard drive of the PC workstation to a videotape (or other possible media in the future). The story consists of a sequence of video and audio elements (images, voice messages, music) that are played in a predetermined order to create the story. In that sequence, the background images with the superimposed heads will appear in their predetermined places to create a personalized videotape. (Block 70).

Audio Personalization:

An audio file called "Names" is first produced, containing digitized recordings of the various names spoken by a voice artist. (Block 68). Of course, a computer synthesized voice may be used, especially if it is tuned to sound human.

When the presentation is created, the appropriate name is inserted at the predetermined point in the story. The name is "justified", either right or left, so that it will be naturally spoken in the context of the sentences in which it appears, with no unwanted pause between the name and preceding or subsequent words, or at other portions of the soundtrack, and so that the soundtrack remains in synchronization with the video sequence. (Block 70).

FIG. 11 illustrates how the personalized presentation is created (Block 70) from the files of digital representations containing the foreground images ("Faces") 172, the background images ("ABC") 74, the voice file for "Names" ("N") 76, the voice file for narrative ("ABCV") 78 and the music file ("ABCM") 80. As explained above, the video presentation is created by superimposing the correct image of a head (F1, F2, F3, etc.) on successive background images ABC1, ABC2, ABC3, etc.

The audio presentation is created by superimposing digital representations of the names N1, N2, N3, etc. over the voice file ABCV1, ABCV2, ABCV3, etc. In addition, successive digital representations from the music file ABCM1, ABCM2, ABCM3, are supplied at proper intervals.

There results a presentation file 82 which is stored on the hard disk and then "played" through the digital-to-analog converter to a VCR to produce a videotape.

EXAMPLE 3

In contrast to the system described in examples 1 and 2, an alternative system is provided which allows the production to occur in real time and be synthesized, sequenced and directly recorded on a video tape 100 or other video recording device.

Thus, according to this embodiment, a source background video sequence may be provided on a master videotape, in a video tape player 101. In each frame, a foreground image is supplied from a library of images in memory 102, which may include images varying in perspective, size, action (e.g., mouth open, mouth closed, eyes open, eyes closed, smiling, frowning, etc.), lighting, or other characteristics. The image library may also be supplemented with synthesized images, which are interpolated or extrapolated from actual images.

The source background video sequence is coded with SMPTE time codes 103, and may also have other associated information. For example, a close-captioned signal may be included with the audio text, and information regarding the optimum location and orientation of the image.

The source background video image 104 is fed to a 486 PC computer 105 with a modified Television Laboratories Director Turbo system video processor. This video processor allows the facial image to be scaled, rotated and placed in real time on the background video image. The sequence of foreground images is determined by a predetermined program keyed to the SMPTE time codes 103. Therefore, the processing of the foreground image proceeds in sequence, through a series of selections and transformations of the foreground image data.

The audio track 106 is processed by an Apple Macintosh computer 107. Based on a preprogrammed sequence, the SMPTE time codes 103 from the background video sequence control the audio system. At selected chronological locations within the audio sequence, the name of the child is inserted, with the proper intonation and timing. Based on the linguistic relationship of the inserted name, which will have a variable duration, to the remainder of the audio track, which will have a fixed timing, gaps may be added or reduced to maintain the appropriate synchronization. If close caption signals are provided, these may be updated with the child's name as well.

The fixed audio track is preferably recorded on an audio tape, separate from the source background video signal, with only the variable portion, i.e. the child's name, provided by the Apple Macintosh. Of course, the entire audio sequence, including both the fixed and variable portions, may be provided by the audio subsystem, separate from the video source, especially where more complex variable portions are provided, wherein the final production is provided based on the SMPTE time codes, synchronizing the audio and video in the playback process.

The SMPTE code may be either a longitudinal time code (LTC) or a vertical interval time code (VITC), although the LTC is preferred.

The library of images, stored in memory 102, of the human subject as the foreground image may also be interpolated with the background video image sequence, although this is not generally performed in real time, i.e. the interpolated background image cannot generally be directly transferred to the output videorecorder at about 30 frames per second, but rather at a much slower rate due to processing delay.

In the "morphing" or "tweening" process, the foreground human subject image, i.e., the facial image, is coded by hand or through an automated feature coding system, to identify the desired anatomical features such as eyes, ears, nose, mouth, hair, and the like as anchors for the interpolation process. The subject source background image is precoded for corresponding features, and preferably separated from other background elements. During the pre-production process, frames with the subject foreground and subject background images are interpolated, either in a fluid transition, i.e., "morphed", or as a hybrid, i.e., "tweened", in a manner which primarily preserves the characteristics of the subject foreground image for the primary facial features, and which preserves distinctive contextual subject background features, so that the resulting image is identifiable as the original subject, with morphological modifications. The interpolated images are then stored and merged with the background image during final production.

Further, the foreground image may be altered in expression, and, for example, lips from a still image may be made to appear to move.

It is also possible to perform an image interpolation in real time, so that the foreground subject image is merged with the background subject image during the final production; however, this requires a great amount of processing powder.

EXAMPLE 4

The method according to example 3 is implemented as follows:

First, an sequence of images of a human subject head is obtained by means of a video camera 14 or other electronic imaging system. These images differ in orientation and positioning, an a manner which is recorded in conjunction with the image. Therefore, a desired positioning and orientation for a cohesive match with the background image may be obtained by selecting the closest image actually obtained, which may then be further transformed by linear scaling, interpolation, or other processing. The subject stands on a turntable 18, which turns about axis 20. The rotation of the turntable 18 is controlled by a control 110, which is interfaced to a synchronizer 111, which also synchronizes a videotape recorder 24, which receives a signal from a videocamera 14, directed at the head 16 of the subject.

The human subject head is then separated from the remaining features either automatically or manually. For example, if the images are obtained in front of a blue screen, a chroma-key unit may be used to provide a transparent margin for the foreground image. Alternatively, the edge of the head may be traced by an image processing algorithm to remove the remaining external features. The separation may also be performed manually, as described above with respect to examples 1 and 2.

A unique positioning may be automatically determined for each image, e.g. 131-138, for example by determining a central axis v and a point p, i.e. the lowest portion of the face, the chin, as shown in FIG. 13. The size or scaling of the head may also be determined by measuring a distance from the bottom to top of the head, i.e., along the central axis, and relating this distance to a standard, as depicted in FIG. 12. In FIG. 12, a foreground image 121 is separated into a head portion 122. A point p is determined which defines a positioning of the head 122. The scaling of the head 122 is also determined by measuring a characteristic dimension x. The characteristic dimension x is related to a desired dimension y and the head rescaled to a new head image 123. The background image 124 defines a background, as well as a desired positioning d and the desired scaling. The scaled foreground image 123 is merged with the background image 124 by superposing the scaled head 123 with the defined point of the scaled head 123 coinciding with the desired positioning d.

The positioning and scaling may also be manually determined, in accordance with the above description with respect to examples 1 and 2.

A background graphic sequence is provided, preferably on an SMPTE encoded videotape. A corresponding file includes information relating the SMPTE codes with desired positioning and scaling of the foreground image. The background image is then fed to a video processor, e.g., the aforementioned Television Laboratories Director Turbo system, where it is digitized and temporarily stored in a frame buffer. The video processor receives a selected foreground image, which is then scaled and positioned in real time. The foreground image is overlayed on the background image and output from the video processor as an NTSC signal, which is recorded on a video recorder.

Simultaneously with the video processing, the SMPTE codes are used to determine an audio track. A constant audio track is provided in synchronization with the background video. The SMPTE codes are fed to a Macintosh computer, which is preprogrammed to relate the sequence of audio information. At particular times, a variable audio portion, i.e., a name, is inserted in the audio track. The predetermined sequence also includes information regarding the placement of the variable portion within the allotted timespace. Thus, the variable audio may be placed at the beginning, end, or middle of the timespace. The variable audio portion and the fixed audio portion are then mixed and recorded with the composite video on the video cassette recorder.

Of course, it should be understood that sequences of video buffer frames may also be present around the time occurrence a variable speech portion. Therefore, the length of the gap between fixed audio portions may be varied by truncating frames or by providing interpolated frames in the variable time portion, so that variable length sound gaps need not occur.

EXAMPLE 5

In accordance, for example, with the method described generally in U.S. Pat. No. 5,850,463, a facial image is processed to alter a facial expression thereof. Thus, the facial image may be fully animated to alter expression, apparent mood, mouth, cheek and eye movements. Further, the head may be rotated or otherwise viewed from any angle.

This process is generally accomplished by using one or more two dimensional images to create a model or surface model of the head of the subject. (The entire body, or any portion thereof may also be modeled in like manner). Once the head is modeled or mapped onto a surface model, e.g., a wire frame, the model may be viewed from any given perspective, subjected to artificial lighting effects or to eliminate lighting effects in the original image, and animated according to normal or even abnormal degree of freedom. The normal degrees of freedom correspond to the natural muscles and joints within the body structure, while an abnormal degree of freedom would correspond to an artificial or abnormal movement, which would normally be impossible in nature.

In the case of a wireframe model of the body part, on which the externally acquired image is mapped, the movements, which include translation, scaling and rotations, as well as lighting changes, and movement of portions of the model with respect to each other based on a rearrangement of the nodes of the underlying model, may be choreographed with the other aspects of a presentation, for example music (e.g., lip syncing), gross body movements, and the like. See U.S. Pat. No. 6,028,960 (Graf, et al.) Feb. 22, 2000.

A video mosaicing system is described in U.S. Pat. No. 5,907,626 along with it cited references, including U.S. Pat. Nos. 5,280,530, 4,783,833, 5,262,856, 5,617,482, 5,649,032, and 5,657,402.

In this type of system, a foreground object may be automatically identified, and then substituted based on a synthetic (with respect to the background scene) object. The synthetic object according to the present invention is, for example, a model of the subject's face and/or head. In this case, it is apparent that both the background and foreground may be modified by model based processing, and thus may employ any of the techniques included or associated with MPEG 4 (ITU standard).

It should also be understood that various effects may also be applied to the facial image and/or the underlying model. For example, the model may be subjected to apparent age changes, differing makeup and/or hair styles, "plastic surgery" or other modifications, contextual changes, or merging or morphing effects with other images.

EXAMPLE 6

In contrast to the system described above, an alternative system is provided which allows the production to occur in real time and be synthesized, sequenced and directly recorded on a video tape 100 or other video recording device.

Thus, according to this embodiment, a source background video sequence may be provided on a master videotape, in a video tape player 101. In each frame, a foreground image is supplied from a library of images in memory 102, which may include images varying in perspective, size, action (e.g., mouth open, mouth closed, eyes open, eyes closed, smiling, frowning, etc.), lighting, or other characteristics. The image library may also be supplemented with synthesized images, which are interpolated or extrapolated from actual images.

The source background video sequence is coded with SMPTE time codes 103, and may also have other associated information. For example, a close-captioned signal may be included with the audio text, and information regarding the optimum location and orientation of the image.

The source background video image 104 is fed to a 486 PC computer 105 with a modified Television Laboratories Director Turbo system video processor. This video processor allows the facial image to be scaled, rotated and placed in real time on the background video image. The sequence of foreground images is determined by a predetermined program keyed to the SMPTE time codes 103. Therefore, the processing of the foreground image proceeds in sequence, through a series of selections and transformations of the foreground image data.

The audio track 106 is processed by an Apple Macintosh computer 107. Based oil a preprogrammed sequence, the SMPTE time codes 103 from the background video sequence control the audio system. At selected chronological locations within the audio sequence, the name of the child is inserted, with the proper intonation and timing. Based on the linguistic relationship of the inserted name, which will have a variable durations to the remainder of the audio track, which will have a fixed timing, gaps may be added or reduced to maintain the appropriate synchronization. If close caption signals are provided, these may be updated with the child's name as well.

The fixed audio track is preferably recorded on an audio tape, separate from the source background video signal, with only the variable portion, i.e., the child's name, provided by the Apple Macintosh. Of course, the entire audio sequence, including both the fixed and variable portions, may be provided by the audio subsystem, separate from the video source, especially where more complex variable portions are provided, wherein the final production is provided based on the SMPTE time codes, synchronizing the audio and video in the layback process.

The SMPTE code may be either a longitudinal time code (LTC) or a vertical interval time code (VITC), although the LTC is preferred.

The library of images, stored in memory 102, of the human subject as the foreground image may also be "morphed" with the background video image sequence, although this is not generally performed in real time, i.e. the background image cannot be directly transferred to the output videorecorder at about 30 frames per second, but rather at a much slower rate.

In the "morphing" process, the foreground human subject image, i.e. the facial image, is coded by hand or through an automated feature coding system, to separate the desired anatomical features from the remaining image components, and identify features, such as eyes, ears, nose, mouth, hair, and the like. The source background image is precoded for corresponding features. During production, frames are "morphed", especially in a manner which primarily preserves the characteristics of the foreground image for the primary facial features, and which preserves the background features at the edges and beyond, so that the resulting image of the human subject is an interpolation of a provided foreground image and a background image.

Further, the foreground image may be altered in expression, and, for example, lips from a still image may be made to appear to move.

EXAMPLE 7

The method according to Example 6 is implemented as follows:

First, an sequence of images of a human subject head is obtained by means of a video camera 14 or other electronic imaging system. These images differ in orientation and positioning, an a manner which is recorded in conjunction with the image. Therefore, a desired positioning and orientation for a cohesive match with the background image may be obtained by selecting the closest image actually obtained, which may then be further transformed by linear scaling, interpolation, or other processing. The subject stands on a turntable 18, which turns about axis 20. The rotation of the turntable 18 is controlled by a control 110, which is interfaced to a synchronizer 111, which also synchronizes a videotape recorder 24, which receives a signal from a videocamera 14, directed at the head 16 of the subject.

The human subject head is then separated from the remaining features either automatically or manually. For example, if the images are obtained in front of a blue screen, a chroma key unit may be used to provide a transparent margin for the foreground image. Alternatively, the edge of the head may be traced by an image processing algorithm to remove the remaining features. The separation may also be performed manually, as described above with respect to examples 1 and 2.

A unique positioning may be automatically determined for each image, e.g. 131-138, for example by determining a central axis v and a point p, i.e., the lowest portion of the face, the chin, as shown in FIG. 13. The size or scaling of the head may also be determined by measuring a distance from the bottom to top of the head, i.e., along the central axis, and relating this distance to a standard, as depicted in FIG. 12. In FIG. 12, a foreground image 121 is separated into a head portion 122. A point p is determined which defines a positioning of the head 122. The scaling of the head 122 is also determined by measuring a characteristic dimension x. The characteristic dimension x is related to a desired dimension y and the head rescaled to a new head image 123. The background image 124 defines a background, as well as a desired positioning d and the desired scaling. The scaled foreground image 123 is merged with the background image 124 by superposing the scaled head 123 with the defined point of the scaled head 123 coinciding with the desired positioning d.

The positioning and scaling may also be manually determined.

A background graphic sequence is provided, preferably on an SMPTE coded videotape. A corresponding file includes information relating the SMPTE codes with desired positioning and scaling of the foreground image. The background image is then fed to a video processor, e.g., the aforementioned Television Laboratories Director Turbo system, where it is digitized and temporarily stored in a frame buffer. The video processor receives a selected foreground image, which is then scaled and positioned in real time. The foreground image is overlayed on the background image and output from the video processor as an NTSC signal, which is recorded on a video recorder.

Simultaneously with the video processing, the SMPTE codes are used to determine an audio track. A constant audio track is provided in synchronization with the background video. The SMPTE codes are fed to a Macintosh computer, which is preprogrammed to relate the sequence of audio. At particular times, a variable audio portion, i.e., a name, is inserted in the audio track. The predetermined sequence also includes information regarding the placement of the variable portion within the allotted timespace. Thus, the variable audio may be placed at the beginning, end, or middle of the timespace. The variable audio portion and the fixed audio portion are then mixed and recorded with the composite video on the video cassette recorder.

Of course, it should be understood that sequences of video buffer frames may also be present around the time occurrence a variable speech portion. Therefore, the length of the gap between fixed audio portions may be varied by truncating frames or by providing interpolated frames in the variable time portion, so that variable length sound gaps need not occur.

EXAMPLE 8

Figure 18:
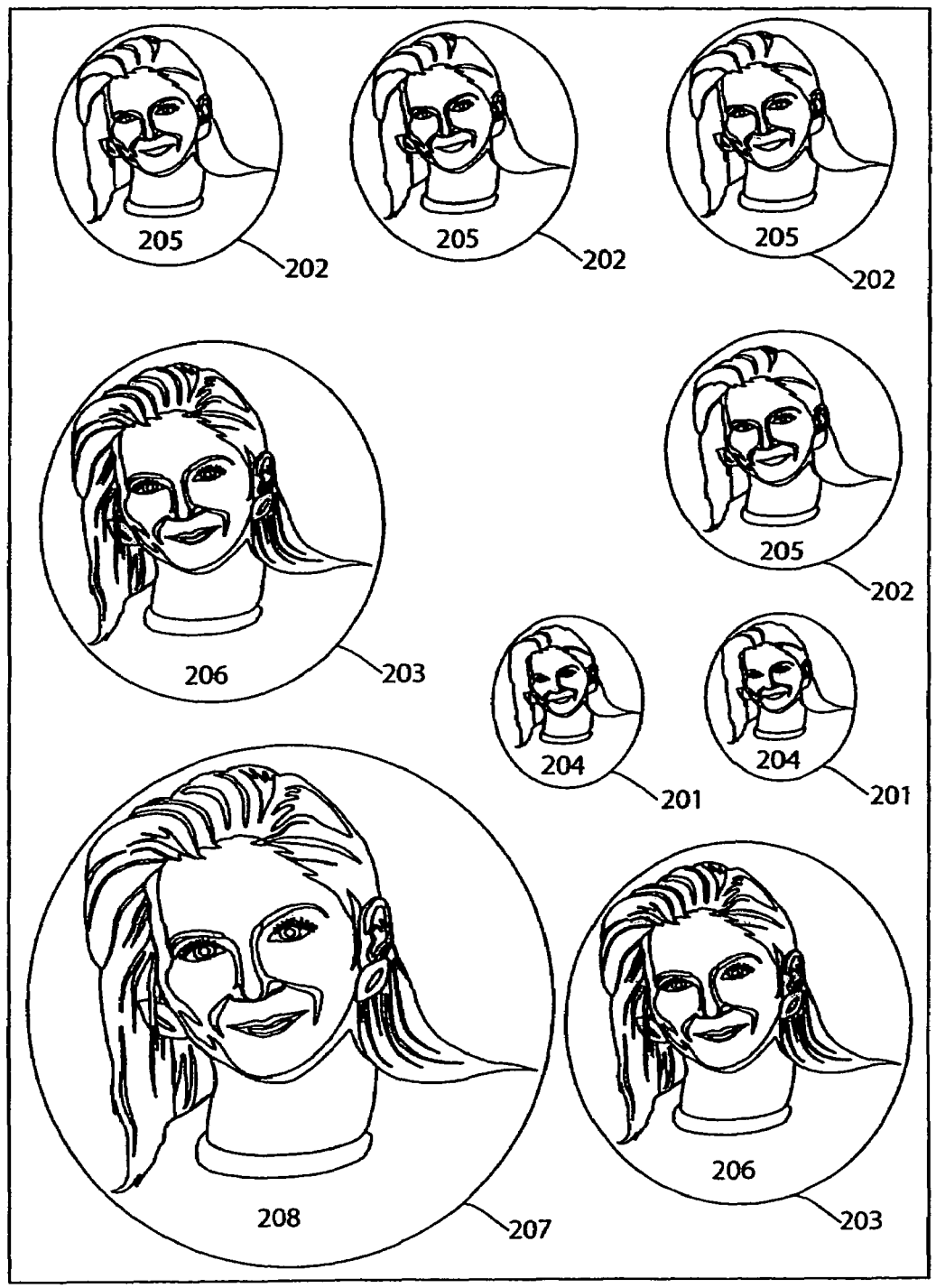
FIG. 18 shows a label sheet having a plurality of different sized representations.

FIG. 18 shows a sheet of facial images 201, 202 and 203 produced in accordance with the present invention. The printed images are preferably provided in a number of sizes, e.g. small 201, medium 202 and large 203, each having a standardized margin 204, 205, 206 allowing placement of the custom printed images 201, 202, 203 on an appropriate generic background image. The generic background images are included, for example, in a preprinted book or pamphlet, having images which are designed to accept the custom printed images to yield a composite image with an aesthetically pleasing result, or a plastic sheet having a background pattern on which die cut portions including the custom printed images on the sheet may be temporarily positioned and removed. The book preferably has a cover (not shown) which has a visible aperture, either with a clear path or a transparent material, showing a location intended for a printed or manually affixed image. The preprinted pages may, for example, have codes or outlines printed in places where particular images are intended to be placed, simplifying the process of selecting and placing a custom image which corresponds to the preprinted image.

Where a book is provided, the pages may be customized with text which includes the name of the person whose images accompany the book. This printed text may be justified in known manner with the insertion of the name, and printed using either the same printing technology employed for the images, or any other known text printing technologies.

It is also possible to provide computer software and printable sheets for use with a home computer, allowing the user to make the sheets themselves.

EXAMPLE 9

Figure 19:
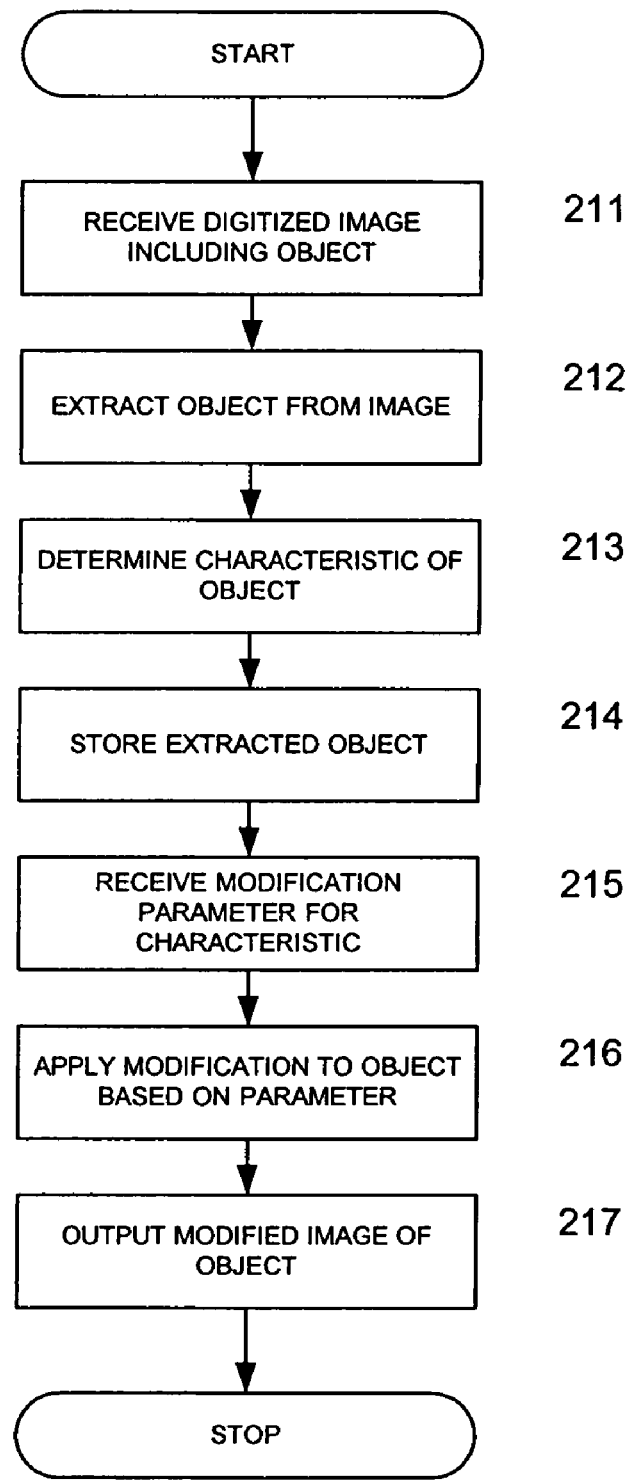
FIG. 19 shows a flow chart of a method in accordance with the present invention.
Figure 20:
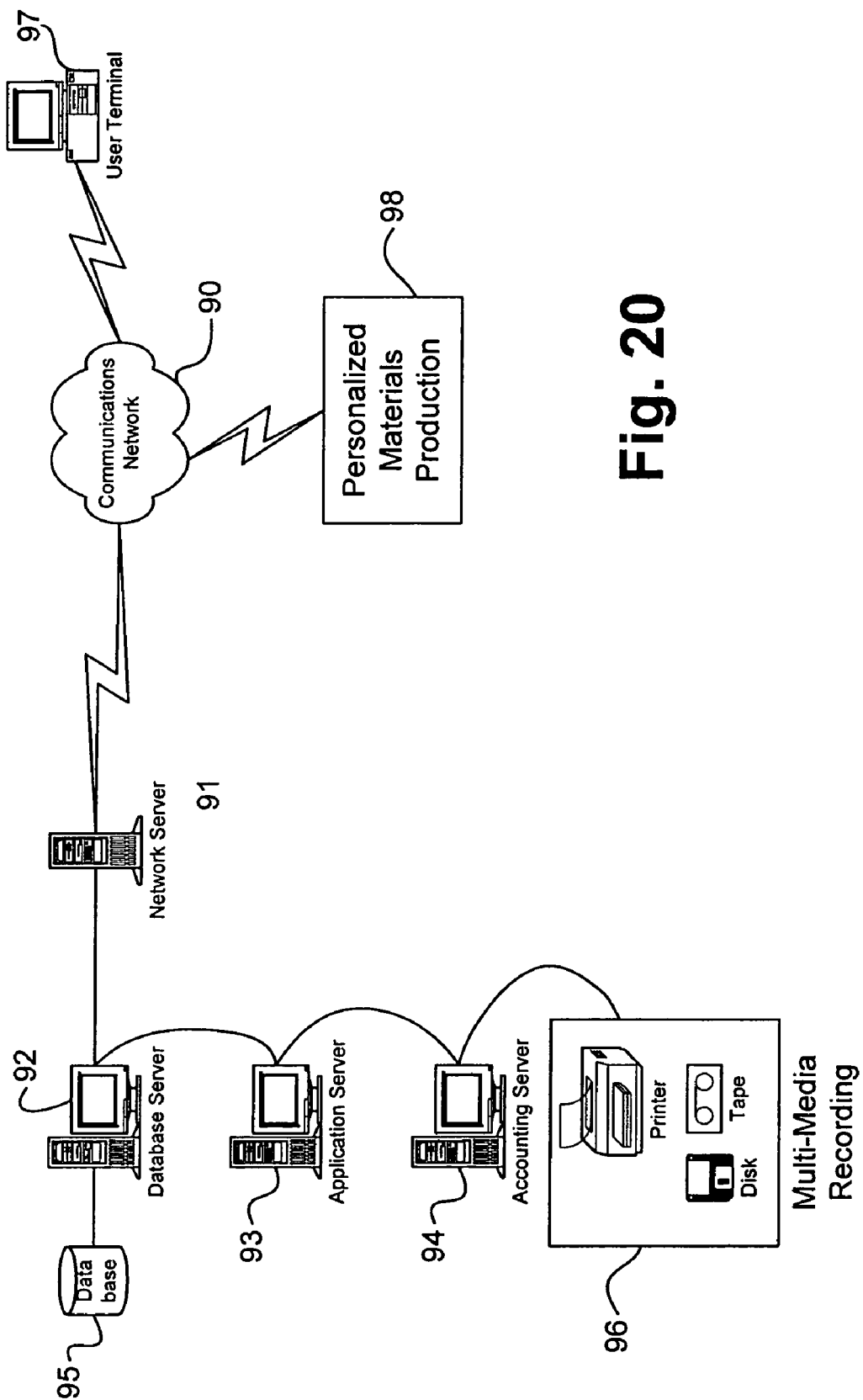
FIG. 20 is a diagram of a communication network with components according to the present invention.
Figure 21:
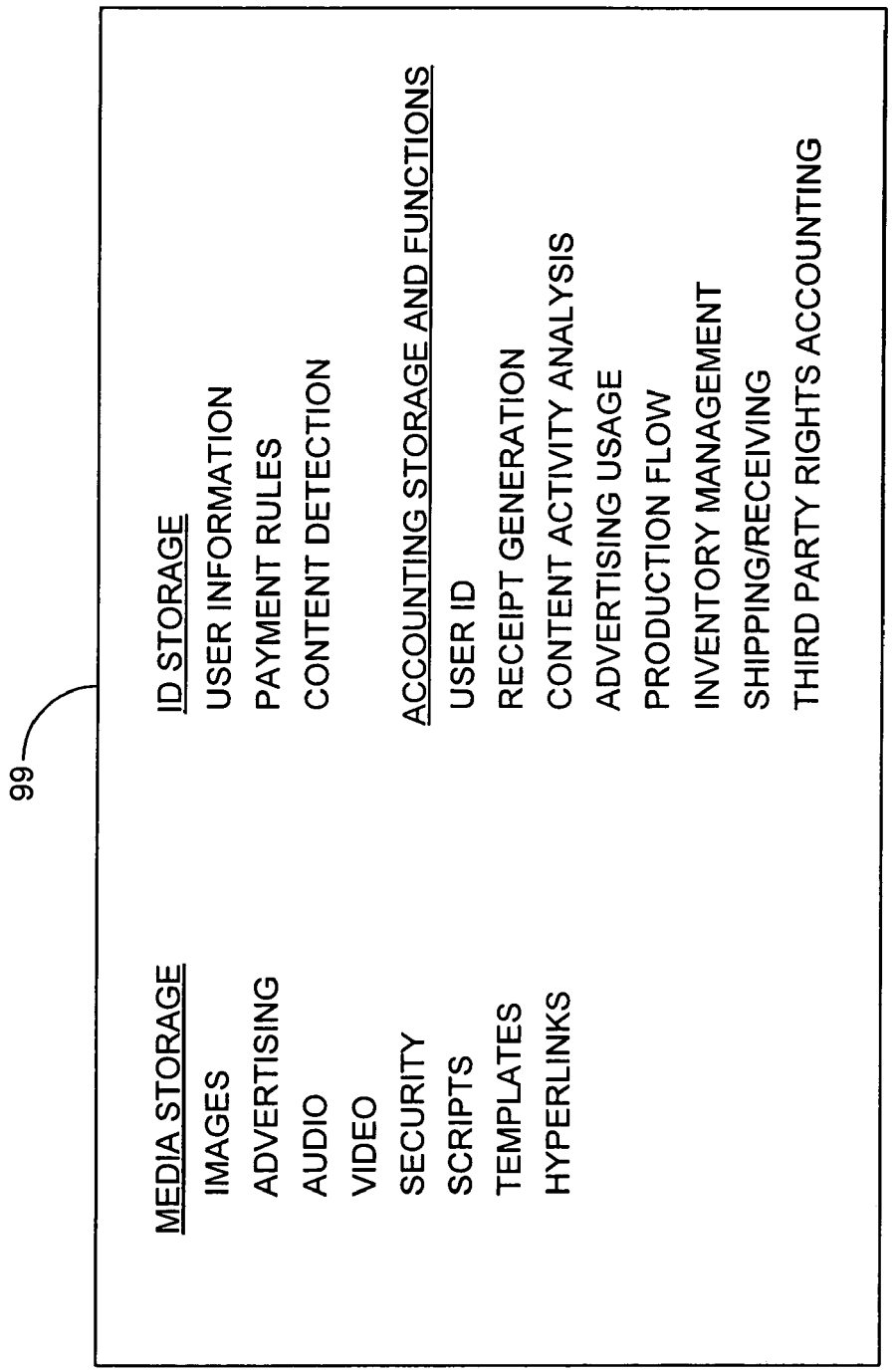
FIG. 21 is a diagram of a database content according to the present invention.

FIG. 19 shows a flow chart of a method in accordance with the present invention. A digitized image, including an object, is received by a processor 211. The object may be, for example, an anatomical feature, or portion thereof, of a person or animal, such as the head, eyes, face, hands, limbs, etc., or other type of object, such as a plant, tree, building, car, boat, etc. The object has at least one characteristic, which as discussed below, is determined. The digitized image is stored, at least temporarily, while further processing takes place, although the complete digitized image need not be stored permanently. The digitized image may be a single still frame, received from a scanned photograph or electronic camera, or a series of images, such as a idea, digital video or cinema image stream.

The object is then extracted from the digitized image 212. This extraction may be manual or semiautomatic, directed by a user, who identifies the object or the margins of the object, or participates in a selection procedure which identifies the object in one or more frames. The extraction may also be highly automated, using logic and/or artificial intelligence to identify the object and extract it from the image. Where the digital image is a single frame, the object extraction may be a simple two-dimensional image analysis. However, where the digital image comprises a number of frames, separated in time and/or space, the object extraction is preferably a more complex three or four dimensional image analysis. Where the input stream is video data, a calculated motion vector component may advantageously be used to separate a foreground object from a background image. Pattern recognition techniques may also be used to extract the object. The extracted object may also include modeling data, relating to characteristics not directly apparent or present in the digitized image.

A characteristic of the object is then determined 213, based on the digitized image and/or the extracted object. For example, this characteristic may be a size, shape, scaling, rotation, translation, hue, brightness, gradient of hue or brightness, other color space characteristic, object identification, type, or the like.

The extracted object is stored 214, e.g. sufficient data is maintained in a persistent manner to allow reconstruction of the object or an image thereof at a later time.

The system is provided with a parameter for modifying the characteristic of the object 215. This parameter may be static or change for each object, and indeed there may be a plurality of parameters which may be applied individually or in groups, in one or more instances, to the object. Each parameter may be dimensionless, a simple vector or a more complex matrix.

The modification or modifications are then applied to the object, bared on the parameter 216, to generate representations of one or more modified objects. Generally, the modified objects will be stored in memory for later processing or output, although the object may also be processed or rendered in real-time and not stored as such.

The modified image of the object is then output 217. The output de ice is generally a printer, such as an ink-jet, laser (toner based), dye sublimation, thermal transfer, or wax deposition printer, or an analog or digital electronic image output. Of course, the output may also be a computer aided manufacturing system to produce a relief or three dimensional object, a laser imaging system, a holographic imaging system, or other known type. In one embodiment, the image of the object is output onto a plastic film which is self-supporting, and has adhesion characteristics without the use of an added adhesive.

In this manner, customized image outputs may be automatically or semi-automatically produced from non-standardized input images.

EXAMPLE 10

A database server is provided having a set of image models, a set of presentation templates, an audio track generation system, and stored user information, which may include audio, video, demographic or other types of information.

A user, who may be a trained user or a consumer, selects one or more appropriate image models and a presentation template. An application server, which may reside in the same environment as the database server, applies the user data and image models to the presentation template. Further, based on the user data, image models and presentation template, an accompanying audio presentation is defined. The presentation is then output, for example through a web server or to a multimedia recording system, and the output presentation delivered to the user. Electronic delivery may occur in real time, in a multimedia stream, or as an advance transmission.

The image models may be simple two-dimensional images, or more complex models, for example represented in three dimensions with multiple degrees of freedom, and corresponding parameters of control. The template may also be a simple two-dimensional background sequence, or a complex model. According to one option, the image models and template define data in an MPEG-4 file.

The degrees of freedom may include translation, rotation, scaling, movement of joints, transformational changes and the like.

The stored user information are typically simple data types with pixel image information, audio information, and binary (or text) information. This stored user information, however, when integrated with the image model and template may assume substantially higher complexity. Thus, the stored user information may include a facial image. The facial image may be extracted and superposed on a facial model using critical points, such as eyes, mouth, and head outline. If the underlying image model is animated, the dynamic movements may be applied to the facial image, thus providing an animated facial image corresponding to the stored user information.

In like manner, the audio track may include audio or vocal models, which may be used to present a text or phonetic presentation. The stored user information may include, for example a voice recording. A vocal model may then be extracted from the voice recording, and the vocal model used in the audio tracks of the presentation. Alternately, the semantic content of the audio recording may be extracted, and applied to a vocal model determined by the template.

EXAMPLE 11

A presentation is stored in a central server. A user accesses the server to identify himself and select the presentation. The user provides user information, which may include audio recordings, images, and descriptive or accounting information.

The central server analyzes the user information for the presence of associated information or a digital watermark indicative of a content protection scheme. If such a content protection scheme is detected, the particular scheme is identified. In many instances, the scheme will preclude copying, and the user information will be rejected. In other instance, a scheme which permits copying but requires a compensatory payment is defined. In that instance, the user may be informed of the required payment, and permitted to authorize the payment, or such payment absorbed by the server system.

If the payment is made, an electronic message is sent to the content owner of the use of the work and identifying a payment modality, which is preferably a so-called micropayment. The central server receives a "receipt" from the content owner or the accounting system which receives the payment, which is in the form of a code. The code is then employed to further digitally watermark the work, to indicate a licensed use and to provide tracking of secondary uses.

The central server accounts for the payment to the content owner by charging a user account or other account for this purpose.

EXAMPLE 12

A plurality of media objects are stored in a centralized database. The user creates a template or script for the display or presentation of these objects on a remote client system. This template or script is defined interactively through a web browser, with feedback in the form of accelerated and normal playback options. The template or script is retained in the central server, associated with a user-associated account. The template is accessible by a URL which optionally requires a password or other authorization.

Once the template is complete, only a reference to the URL is necessary to invoke the presentation. The template may be defined for a particular set of images or multimedia fragments, or be used for a variety of such objects. Preferably, the template is customized to correspond to the specific objects being presented.

The template may include its own timing and synchronization, such as within an SMIL file within a compliant browser, or be triggered by successive events within the client system. The data may be streamed or cached locally.

An audio background may be simultaneously provided or synchronized with the presentation. Thus audio may be provided in known manner, for example as a WAV file, MIDI file, MP3 file, a streaming format, or other known manner.

EXAMPLE 13

The template may include one or more extrinsic elements, for example commercial advertising information. This information may be relatively unintegrated, for example in the manner of a banner ad, or integrated, for example represented by a complex object within the template or a defined object.

By providing commercial advertising, a convenient means is provided for subsidy of the costs of operating and maintaining the system. An opt-out procedure may be provided, in which a user may avoid the commercial information presentation at higher net usage costs.

Advantageously, the commercial subsidy is triggered by each presentation of the commercial information (or by a formula based on number or frequency of presentations). Therefore, the template advantageously provides means for transmitting aspects of use to an accounting server.

The commercial advertising information may also include hyperlinks to a commercial advertiser web site. Applying this hyperlink may also be associated with an accounting transaction, for example, a different subsidy. It is noted that any object in the presentation, i.e., the template, image model (if present) and user information, may be associated with a hyperlink, which may be internal to the presentation or reference external resources. Likewise, during presentation external elements may be incorporated at run-time, integrated for example by the client or server which renders the presentation.

In this case, the template may be used to control the remote display of a series of images, in the manner of an on-line photo album. Therefore, the template triggers the download and display of images stored on-line. Preferably, these are stored in compressed digital form on a server, and downloaded as needed or somewhat in advance thereof.

By providing hyperlinking and intelligent control over presentation, an interactive C or non-linear presentation results. Thus, decision points may be provided within the flow control, and optionally various processing may be performed contingent on the user interaction. Java and/or Javascript may be employed for cross platform capability, or in a Microsoft Windows® environment. Active X (OCX) controls may be provided.

EXAMPLE 14

An integrated accounting system is provided for financial accounting and process control over the customization of presentations and delivery thereof. A user employs the service for manipulating graphic and/or multimedia information, resulting in an electronically defined product, which may be delivered in tangible or intangible form. In the case of an intangible delivery, the accounting system controls, delivery and storage options, payment method, third party rights accounting. Where a physical product is produced, the accounting system also integrates an inventory management, product flow during production, and shipping/receiving. The accounting system may also provide integration of commercial subsidy accounting, referral fees, and the like, if present.

EXAMPLE 15

An automated framing system receiving on-line orders is also provided. A hard goods factor is provided which receives orders for hard goods, for example picture frames or other photo-personalized goods. For example, a user may wish a particular image to be processed, printed, matted and framed. The user first defines the image itself, including cropping and reproduction size. This may be, for example, from an on-line archive or by ftp or e-mail transmission. If an image is the subject of third party rights, and this is detected, a rights management and rights clearance scheme is implemented to assure adequate rights for reproduction and to compensate the rights holder as necessary.

The user then defines a matting and cover glass (or plastic) option. The user further defines the frame and hanging options. At each step, a preferred embodiment of the invention provides feedback to the user of how the framed picture will look. Using, for example, Internet browser frame technology, only the changed portions need be updated, thereby reducing latency and reducing data transmission requirements. Image portions may be stored locally on a client system or transmitted from a server.

After the framing order is entered, including payment and shipping options, the order is processed. This processing includes printing the image in the desired format, cutting the mat, providing the appropriate cover sheet (glass or plastic, which may be precut or cut to order), and making and assembling the frame.

The frames are formed by cutting a molding into two pairs of sides with 45 degree beveled ends, which are then joined into a rectangle or square by nails, other fasteners or adhesives. The molding stock is loaded into the machines on an as-needed basis. In order to reduce loading and unloading latency, orders requiring the same molding stock and/or post processing finish are aggregated and processed together.

After a frame is produced, it is coded with an optically readable bar code. This code allows tracking through the process to ensure that all desired options and selections are properly included, and that the image is properly matched with the associated frame. Finally, the code ensures that the complete framed image is shipped to the correct customer.

Other photo-personalized goods may also be generated, for example postcards, boosters, mousepads, coffee mugs, t-shirts, towels, and the like.

Known digital printing processes or transfer processes are employed to create the photo-personalization.

EXAMPLE 16

A video game system is provided having a solid state or disk program storage system and a telecommunications system. A user provides photographs of a subject to a service bureau, which processes the photographs, which may be emulsion or digital, to separate the foreground subject image from the background image. Further, the foreground image is analyzed to determine characteristic features, such as coloration, location of eyes, ears, nose, hair line, and any other significant visible features. These characteristic features are then stored in a file for that user in an on-line service, for example as an e-mail transmission, file transfer protocol transmission, hypertext document, binary object or other format.

When the user seeks to operate the game system, the telecommunications link is opened, and the file downloaded to the game system. In the game system, the characteristic feature file is used to modify one or models stored as part of a content presentation, e.g., video game. The characteristic features are integrated, so that the two dimensional image or images originally provided are mapped to an appropriate or close three-dimensional representation thereof. This representation, typically in the form of a wire frame model, is then animated according to the content presentation. During each frame period, the wire frame model is rendered to appropriately present the composite model, allowing it to appear, e.g., like the original subject, or with desired modifications.

There has thus been shown and described a novel method and apparatus for producing customized images which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. These images may be used by children or adults, and for novelty, business or educational purposes. All such changes, modifications, variations and other uses and applications which do not depart from the spirit and scope of the invention are deemed to be covered by the invention, which is to be Limited only by the claims which follow.

What is claimed is:

1. A system for providing a customized media stream, comprising:
   a media stream processor configured to:
   access first and second media streams, the first media stream including a first portion of a first body and the second media stream comprising a second portion of a second body, wherein said second body is different from said first body and changes position within the second media stream;
   derive reference information from said first portion of said first body on said first media stream and said second portion of said second body on said second media stream based on a selection criteria; and
   based on said derived reference information:
   resize said first portion of said first body to proportionally conform with said second portion of said second body as said second body changes position within the second media stream, and
   provide said customized media stream having a composite body defined by combining said first portion of said first body with said second portion of said second body.

2. The system according to claim 1, wherein said media stream processor is configured to operate on said first and second media stream portions with said reference information to provide said combination.

3. The system according to claim 2, wherein said media stream processor is operable to fully provide said reference information prior to providing said combination.

4. The system according to claim 1, wherein said selection criteria is related to at least one of a reference point, a scaling factor, a rotation axis and a rotation degree.

5. The system according to claim 1, wherein said selection criteria is related to at least one of a reference time point, a reference time length and a synchronization signal.

6. The system according to claim 1, wherein combining comprises overlaying said first media stream portion on said second media stream portion to form said customized media stream.

7. The system according to claim 1, wherein the media stream processor is further configured to:
   access external control information;
   wherein at least a portion of said selection criteria is derived from external control information.

8. The system according to claim 7, wherein:
   said external control information is substantially provided in realtime; and
   said reference information is substantially derived in realtime to thereby permit said combination to be produced in substantially realtime.

9. The system according to claim 1, further comprising a transmission medium coupled to said media stream processor for transmitting at least one of said first and second media stream portions, said reference information and said combination.

10. The system according to claim 9, further comprising:
    a user interface coupled to said transmission medium for receiving said at least one of said first and second media stream portions, said reference information and said combination; and
    a display coupled to said user interface for displaying said combination.

11. The system according to claim 10, wherein said selection criteria is receivable from said user interlace.

12. The system according to claim 10, wherein said user interface can provide instructions to said media stream processor for providing and sending at least one of said first and second media stream portions, said reference information and said combination.

13. The system according to claim 10, wherein:
    said media stream processor can operate on said first and second media stream portions with said reference information to provide said combination; and
    said media stream processor is operable to present said combination to said transmission medium for transmission to said user interface for display.

14. The system according to claim 10, wherein:
    said user interface further comprises another media stream processor coupled to said transmission medium;
    said another media stream processor being operable to receive said first and second media stream portions and said reference information; and
    said another media stream processor can operate on said first and second media stream portions with said reference information to provide said combination for presentation to said display.

15. The system according to claim 1, wherein:
    said user interface further comprises another media storage device coupled to said another media storage processor; and
    said another media storage processor operable to store at least one of said first and second media portions, said reference information and said combination on said another media storage device.

16. The system according to claim 1, wherein said media stream processor is further configured to access:
    a media combination template for defining said combination of said first and second media stream portions; and
    wherein said template includes said reference information.

17. The system according to claim 16, wherein said template is provided by at least one of a user and an automatic algorithm.

18. The system according to claim 17, wherein application of said template to said first and second media stream portions can substantially occur in realtime.

19. The system according to claim 1, wherein:
    at least one of said first and second media stream portions contains distinctive media features; and
    said selection criteria can include parameters related to said distinctive media features, whereby said reference information can relate to said distinctive media features for use in said combination.

20. The system according to claim 19, wherein:
    said media stream processor is operable to generate said parameters according to an algorithm applied to said media stream processor; and
    said parameters contribute to identification of said distinctive features.

21. The system according to claim 20, wherein said selection criteria parameters include a normalization parameter for defining a normalized state of said distinctive media features.

22. The system according to claim 19, wherein said selection criteria is provided by a template including script information for animation of said distinctive media features.

23. The system according to claim 1, further comprising:
modular portions of at least one of said first and second media stream portions; and said selection criteria includes levels of customization related to said modular portions for deriving said reference information specific to each of said modular portions.

24. The system according to claim 1, wherein at least one of said first and second media stream portions contains at least one of audio, video, still image, text and graphic presentation information.

25. The system according to claim 1, wherein said media stream processor is configured to derive said reference information at least in part by
analyzing at least one of said first and second media stream portions to identify dimensional information related to said media representations.

26. The system according to claim 25, wherein said additional dimensional information includes at least one of a rotation axis, a depth dimension, a motion dimension and a motion velocity dimension.

27. The system according to claim 1, wherein at least one of said media streams is provided by a media presentation source comprising a public media production facility.

28. The system according to claim 1, wherein said reference information includes at least one of a morphological combination, an interpolated combination and an extrapolated combination of said first and second media stream portions.

29. The system according to claim 1, wherein said media stream processor is further configured to execute an algorithm for generating said first media stream port.

30. The system according to claim 29, wherein:
said media stream processor is further configured to execute another algorithm for generating said second media stream portion; and
said reference information includes algorithmic information for providing said combination.

31. The system according to claim 30, wherein said selection criteria includes parameters for said algorithm.

32. The system according to claim 31, wherein said parameters are modifiable during execution of said algorithm by said media stream processor.

33. The system according to claim 1, wherein at least one of said media presentation sources is a database.

34. The system according to claim 33, wherein said database contains access rights information to selectively permit access to discrete contents of said database.

35. The system according to claim 34, wherein said database contains access rights information to selectively permit access to discrete contents of said database.

36. The system according to claim 35, wherein said access rights can be designated public or private.

37. The system according to claim 34, wherein at least one of said first and second media streams is derived from said discrete contents of said database.

38. The system according to claim 33, wherein said database contains rules for at least one of accounting and licensing of selective database content.

39. The system according to claim 38, wherein:
said rules are operable to generate records based on database accesses; and
said records are storable at least one of remotely and locally.

40. The system according to claim 38, wherein said rules provide a selection for a response based on at least one of lack of access to said discrete contents and a lack of payment for access to said discrete contents.

41. The system according to claim 33, wherein said database further comprises an automated processing tool for automating changes to said database.

42. The system according to claim 41, wherein said database changes include at least one of modification of access rights, modification of database contents and access of said database contents to provide at least one of said first and second media streams.

43. The system according to claim 33, wherein said database can store said combination of portions of said first and second media streams.

44. The system according to claim 33, wherein said database is distributed across several physical locations.

45. The system according to claim 33, further comprising a script, whereby discrete portions of said database can form at least one of said first and second media streams automatically according to said script.

46. The system according to claim 45, wherein said script contains a filter, whereby said discrete portions are automatically selected or deselected according to said filter.

47. The system according to claim 45, wherein said script includes synchronization information for forming said customized media stream.

48. The system according to claim 33, wherein said database is structured to permit open dynamic sharing for access to a plurality of custom contents.

49. The system according to claim 1, wherein said customized media stream includes programmed references including at least one of a hyperlink, and advertisement and a commercial presentation.

50. The system according to claim 1, wherein said customized media stream is formed as a slide show.

51. The system according to claim 50, wherein said slide show is at least one of non-sequential and interactive.

52. The system according to claim 1, wherein at least one of said first and second media streams contain map information.

53. The system according to claim 52, wherein:
said selection criteria includes variable related to said map information; and
said variables can be set to indicate conditions of modifiable characteristics of said map information.

54. The system according to claim 53, wherein said conditions include media presentation information for an individual.

55. The system according to claim 1, wherein at least one of said first and second media streams contains two separate custom media presentations.

56. The system according to claim 55, wherein said two seperate custom media presentations are additive to form a single custom media presentation.

57. The system according to claim 1, wherein at least one of said first and second media streams contains an avatar for use with a custom media presentation from at least another of said first and second media streams.

58. The system according to claim 1, wherein said customized media stream is at least one of analog and digital.

59. A method implemented by a computer for providing a customized media stream, comprising:
accessing a plurality of media presentation sources for providing media presentation streams;

obtaining a first and second media stream from one or more of said media presentation sources for representing media presentations;

said first media stream including a first portion of a first body;

said second media stream including a second portion of a second body, the second body different from the first body;

selecting criteria for combining said first portion of said first body on said first media stream with said second portion of said second body on said second media stream;

deriving reference information from said first and second media streams based on said selected criteria; and based on said reference information and said selected criteria, using computer device for:

resizing said first portion of said first body to proportionally conform with said second portion of said second body as the second body changes position within the second media stream; and processing said first and second media streams to provide a composite body defined by combining said first portion of said first body with said second portion of said second body.

60. A storage memory for storing a program code executable by a computer to provide a customized media presentation, said program code comprising:

a first code section executable to access a plurality of media presentation sources for providing media presentation streams;

a second code section executable to obtain a first and second media stream from one or more of said media presentation sources for representing media presentations;

said first media stream including a first portion of a first body;

said second media stream including a second portion of a second body, the second body different from the first body;

a third code section executable to permit a selection of criteria for combining said first portion of said first body on said first media stream with said second portion of said second body on said second media stream;

a fourth code section executable to deriving reference information from said first and second media streams based on said selected criteria;

a fifth code section executable to based on said reference information and said selected criteria:

resize said first portion of said first body to proportionally conform with said second portion of said second body as the second body changes position within the second media stream; and process said first and second media streams to provide a composite body defined by combining said first portion of said first body with said second portion of said second body.

61. A system for providing a customized media stream, comprising:

a media stream processor configured to:

access a first media presentation source providing an image of a first portion of a first body;

access a second media presentation source providing a media stream, said media stream including a second portion of a second body, the second body different from the first body;

derive reference information from said first portion of said first body and said second portion of said second body based on a selection criteria; and based on said derived reference information, resize said first portion of said first body to proportionally conform with said second portion of said second body as said second body changes position within the second media stream, and provide said customized media stream having a composite body defined by combining said first portion of said first body with said second portion of said second body.

62. A method implemented by a computer for providing customized media stream, comprising:

accessing a first media presentation source, said first presentation source providing an image of a first portion of a first body;

accessing a second media presentation source, said second presentation source providing a media presentation stream, said media stream including a second portion of a second body, the second body different from the first body;

selecting criteria for combining said first portion of said first body with said second portion of said second body;

deriving reference information based on said selected criteria;

based on said reference information and said selected criteria, using a computing device for processing said image and said media stream by:

resizing said first portion of said first body to proportionally conform with said second portion of said second body as the second body changes position within the second media stream; and providing a composite body defined by combining said resized first portion of said first body with said second portion of said second body.

63. A storage memory storing program code executable by a computer to provide a customized media presentation, said program code comprising:

a first code section executable to access first and second media presentation sources;

a second code section executable to obtain an image from said first media presentation source, said image including a first portion of a first body;

a third code section executable to obtain obtaining a media stream from said second media presentation source, said media stream including a second portion of a second body, said second body different from said first body;

a third code section executable to permit a selection of criteria for combining said first portion of said first body with said second portion of said second body;

a fourth code section executable to derive reference information from said image and said media stream based on said selected criteria;

a fifth code section executable to based on said reference information and said selected criteria:

resize said first portion of said first body to proportionally conform with said second portion of said second body as the second body changes position within the second media stream; and process said image and media stream to provide a composite body defined by combining said first portion of said first body with said second portion of said second body.

64. A method implemented by a computer for providing customized media stream, comprising:

receiving an image of a first portion of a first body from a first media presentation source;

accessing a second media presentation source different from the first media presentation source, the second presentation source providing a media stream, the media stream including a second body that changes position within the media stream, the second body different from the first body;

after receiving the image from the first media presentation source, deriving reference information based on the image of the first body for use in resizing a portion of the first body; and generating a composite media stream by using the image of the first body, the media stream, and the reference information to combine the portion of the first body with the second body within the media stream, wherein generating the composite media stream comprises resizing the portion of the first body to proportionally conform with the second body as the second body changes position within the second media stream, including resizing the portion of the first body to conform with the second body as the second body changes depth within the media stream.

65. The method set forth in claim 64, further comprising:

receiving a plurality of images, each image comprising a first portion of a different first body; and generating a plurality of composite media streams, each composite media stream generated by using a first portion of a first body in each respective image, reference information derived based on the respective image, and the media stream from the second media presentation source.

* * * * *